(12) United States Patent
Oshima

(10) Patent No.: US 10,493,944 B2
(45) Date of Patent: Dec. 3, 2019

(54) HEAD-PROTECTING AIRBAG DEVICE

(71) Applicant: TOYODA GOSEI CO., LTD., Kiyosu-shi, Aichi-ken (JP)

(72) Inventor: Masahiro Oshima, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 83 days.

(21) Appl. No.: 15/877,481

(22) Filed: Jan. 23, 2018

(65) Prior Publication Data
US 2018/0281740 A1  Oct. 4, 2018

(30) Foreign Application Priority Data

Mar. 29, 2017  (JP) .................................. 2017-066122

(51) Int. Cl.
  *B60R 21/2334* (2011.01)
  *B60R 21/232* (2011.01)
  *B60R 21/20* (2011.01)
  *B60R 21/2338* (2011.01)

(52) U.S. Cl.
  CPC .......... *B60R 21/2334* (2013.01); *B60R 21/20* (2013.01); *B60R 21/232* (2013.01); *B60R 2021/23388* (2013.01)

(58) Field of Classification Search
  CPC . B60R 21/232; B60R 21/235; B60R 21/2334; B60R 21/201
  See application file for complete search history.

(56) References Cited

U.S. PATENT DOCUMENTS

| 9,637,081 B2 | 5/2017 | Ryan et al. |
| 9,796,351 B2 * | 10/2017 | Fujiwara .............. B60R 21/207 |
| 2018/0099634 A1 * | 4/2018 | Ohno .................... B60R 21/213 |

FOREIGN PATENT DOCUMENTS

| JP | 2006-096288 A | | 4/2006 |
| JP | 2012158319 A | * | 8/2012 |
| JP | 2016-101881 A | | 6/2016 |

OTHER PUBLICATIONS

Translation of JP2012158319A (Year: 2012).*

* cited by examiner

*Primary Examiner* — Faye M Fleming
(74) *Attorney, Agent, or Firm* — POSZ Law Group, PLC

(57) ABSTRACT

A head-protecting airbag device includes an airbag including a bag body and a cover sheet, the bag body including a gas inflow portion. The gas inflow portion includes a gas supply passage portion and a shielding inflatable portion, the gas supply passage portion being located in an upper edge side of the bag body and configured such that an inflation gas initially flows through the gas supply passage portion, and the shielding inflatable portion being disposed below the gas supply passage portion and configured to be inflated to shield the window. The cover sheet is attached to the bag body such that the shielding inflatable portion, rather than the gas supply passage portion, is a protected area, by providing a non-covered area in an upper edge side of the gas inflow portion, the non-covered area being an area in which the cover sheet is not disposed.

5 Claims, 18 Drawing Sheets

FIG. 13
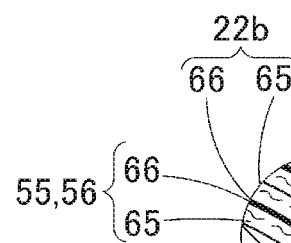
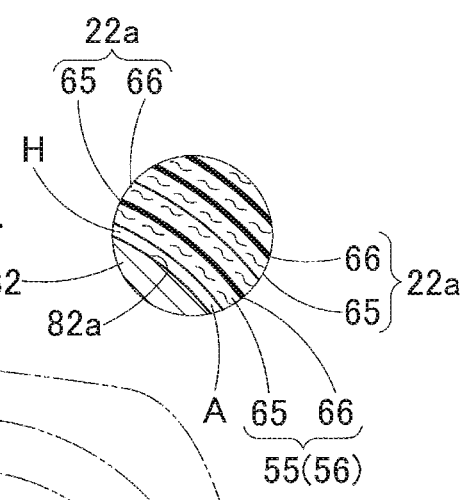
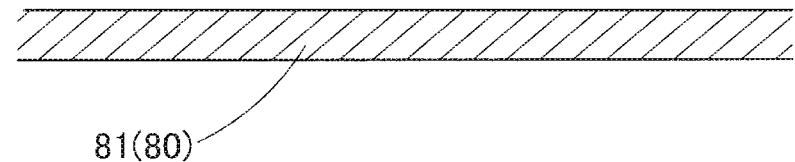

HEAD-PROTECTING AIRBAG DEVICE

INCORPORATION BY REFERENCE

The disclosure of Japanese Patent Application No. 2017-066122 filed on Mar. 29, 2017 including the specification, drawings and abstract is incorporated herein by reference in its entirety.

BACKGROUND

1. Technical Field

The disclosure relates to a head-protecting airbag device including an airbag that is stored in a folded state on a side of an upper edge of a window in an interior side of a vehicle, and is configured to be deployed and inflated downward to cover an interior side of the window when an inflation gas flows into the airbag.

2. Description of Related Art

As this kind of head-protecting airbag device, there is conventionally known a head-protecting airbag device in which an airbag includes a bag body having a gas inflow portion configured to allow an inflation gas to flow into the gas inflow portion, and to be deployed and inflated from a folded state to cover an interior side of a window when the inflation gas flows into the gas inflow portion, and a cover sheet covering the gas inflow portion of the bag body (see, e.g. Japanese Patent Application Publication No. 2016-101881 (JP 2016-101881 A)). In order to prevent strong interference between an upper edge side portion (gas supply passage portion), where the inflation gas initially flows, in the gas inflow portion and a window side member (roof head lining) of a vehicle, the cover sheet is disposed to cover the gas supply passage portion.

There is also known a head-protecting airbag device in which a cover sheet (reinforcing cloth) is disposed to cover a portion of a gas inflow portion of a bag body, the portion of the gas inflow portion being located in the vicinity of an inflator that supplies an inflation gas to an airbag (see, e.g. Japanese Patent Application Publication No. 2006-096288 (JP 2006-096288 A)). The cover sheet is disposed to couple a connection portion connected with the inflator to a non-inflatable portion around the gas inflow portion in the vicinity of the connection portion so as to resist a tensile force in the vicinity of the inflator when the inflation gas initially flows into the airbag, thereby enhancing the connection strength between the inflator and the connection portion.

SUMMARY

However, in JP 2016-101881 A, the cover sheet covers only the vicinity of the upper edge of the gas inflow portion in the bag body of the airbag and thus cannot prevent interference with part of the broken window (broken pieces such as broken glass pieces) when the airbag is deployed and inflated to cover the interior side of the window upon actuation of the airbag device.

Similarly, in JP 2006-096288 A, although the cover sheet covers the portion of the gas inflow portion in the vicinity of the inflator, the cover sheet cannot prevent a portion of the gas inflow portion, which is distant from the vicinity of the connection portion connected with the inflator, from interfering with part of the broken window (broken pieces such as broken glass pieces) when the airbag is deployed and inflated.

The disclosure provides a head-protecting airbag device that makes it possible to efficiently protect a gas inflow portion of an airbag configured to be deployed and inflated from a position on a side of an upper edge of a window.

An aspect of the disclosure relates to a head-protecting airbag device including an airbag fixedly fitted to a body of a vehicle, the airbag being stored in a folded state along a front-rear direction on a side of an upper edge of a window in an interior side of the vehicle, and configured to be deployed and inflated downward so as to cover an interior side of the window when an inflation gas flows into the airbag. The airbag includes a bag body and a cover sheet, the bag body including a gas inflow portion configured to allow the inflation gas to flow into the gas inflow portion, the bag body being configured to be deployed and inflated from the folded state so as to cover the interior side of the window when the inflation gas flows into the gas inflow portion, and the cover sheet having flexibility and being attached to the bag body so as to protect the bag body by covering a surface, at a window side, of the gas inflow portion at a time of deployment and inflation. The gas inflow portion includes a gas supply passage portion and a shielding inflatable portion, the gas supply passage portion being located in an upper edge side of the bag body, and disposed along the upper edge of the window, the gas supply passage portion being configured such that the inflation gas initially flows through the gas supply passage portion, and the shielding inflatable portion being disposed below the gas supply passage portion and configured to be inflated to shield the window. The cover sheet is attached to the bag body such that the shielding inflatable portion, rather than the gas supply passage portion, is a protected area, by providing a non-covered area in an upper edge side of the gas inflow portion, the non-covered area being an area in which the cover sheet is not disposed.

In the head-protecting airbag device according to the above-described aspect of the disclosure, in the gas inflow portion of the bag body of the airbag, the surface at the window side at the time of deployment and inflation is covered with the cover sheet. Therefore, even when part of the broken window (broken pieces such as broken glass pieces) is about to contact the gas inflow portion, the cover sheet receives the broken pieces and thus it is possible to prevent contact of the broken pieces with the gas inflow portion. In particular, the cover sheet is disposed not to cover the gas supply passage portion through which the inflation gas initially flows and the vicinity of the gas supply passage portion, i.e., the upper edge side of the bag body, as the non-covered area. The cover sheet is disposed to mainly cover the shielding inflatable portion as the protected area, i.e., the shielding inflatable portion is set as the protected area. Accordingly, since it is not necessary to cover the entire region of the gas inflow portion in an upper-lower direction, it is possible to reduce the amount of the material of the cover sheet, and thus, the cover sheet can be efficiently disposed.

The gas supply passage portion is disposed in the upper edge side of the bag body, and the inflation gas flowing into the gas inflow portion initially flows into the gas supply passage portion. The gas supply passage portion pushes out the shielding inflatable portion, which is to cover the window, downward from the storage portion for the airbag. Accordingly, the gas supply passage portion is an area that is unlikely to contact the window, and therefore, even when the gas supply passage portion is not covered with the cover sheet, no hindrance occurs.

Therefore, in the head-protecting airbag device according to the above-described aspect of the disclosure, the cover sheet is disposed at the appropriate position and the cover sheet can efficiently protect the gas inflow portion of the airbag that is deployed and inflated from the position on the side of the upper edge of the window.

In the head-protecting airbag device according to the above-described aspect of the disclosure, the cover sheet may be attached to the bag body by support portions and edge sewn portions, the support portions protruding upward at intervals along the upper edge side of the bag body, upper end sides of the support portions being sewn to the upper edge side of the bag body, and the edge sewn portions being respectively sewn to both front and rear edges of the bag body.

With this configuration, since downward displacement of the cover sheet with respect to the bag body can be restricted by the plurality of support portions sewn to the upper edge side of the bag body, the cover sheet can smoothly cover the shielding inflatable portion as the protected area when the airbag is deployed and inflated. The shielding inflatable portion, which protrudes downward from the position on the side of the upper edge of the window at the time of deployment and inflation, may be about to move the cover sheet downward due to its inertia, the cover sheet covering the shielding inflatable portion. However, the support portions can restrict this movement. Also after completion of inflation, the support portions can prevent behavior of the cover sheet, that is, the behavior of protruding from the bag body and hanging downward. Further, in the case where the configuration in which the cover sheet is attached to the bag body by sewing is employed, when a bag body has the same configuration and only the folded shape is changed such that a portion facing the window at the time of deployment and inflation is changed, a cover sheet having a predetermined shape may be attached to a protected area of the bag body by sewing. Thus, it is possible to easily cope with a change in the folded shape or the like.

In the case where the support portions are used, the bag body may include a double-woven portion formed by double weaving and a connection port portion in the upper edge side of the bag body, the connection port portion being connected to an inflator configured to supply the inflation gas; the connection port portion may be disposed by sewing at an opening in the double-woven portion, the opening being located in the upper edge side of the bag body; and the support portions of the cover sheet may be jointly sewn to the bag body when the connection port portion is sewn at the opening of the bag body.

With this configuration, since the support portions of the cover sheet can be joined to the bag body simultaneously with sewing of the connection port portion during the manufacturing of the bag body, the operation of joining the cover sheet to the bag body can be efficiently carried out. Further, sewing of both front and rear edges of the cover sheet to the bag body can be also carried out simultaneously in this sewing process, and thus, the operation of joining the cover sheet to the bag body can be further efficiently carried out.

In the head-protecting airbag device according to the above-described aspect of the disclosure, the cover sheet may be disposed so as to cover substantially an entire region of the gas inflow portion of the bag body along the front-rear direction.

With this configuration, even when the bag body is formed by disposing a plurality of shielding inflatable portions in the front-rear direction, those plurality of shielding inflatable portions can be covered with the single cover sheet. As compared to a case where a plurality of cover sheets are disposed to individually cover the plurality of shielding inflatable portions, i.e. a case where cover sheets in a number corresponding to the number of the shielding inflatable portions are prepared and those cover sheets are joined to the bag body, the cover sheet management and joining operation are required only for the single cover sheet, and thus, the airbag can be efficiently manufactured.

In the head-protecting airbag device according to the above-described aspect of the disclosure, the gas inflow portion of the bag body may be configured such that the inflation gas flows into an area between an interior side wall portion disposed in an interior side of the bag body at a time of completion of deployment and inflation and an exterior side wall portion disposed in an exterior side of the bag body at the time of completion of deployment and inflation; a folded shape of the airbag stored on the side of the upper edge of the window may be such that a folded-in-half body is roll-folded so as to be wound toward an exterior side of the airbag to cause a lower edge side of the folded-in-half body to approach an upper edge side of the folded-in-half body, the folded-in-half body being formed by forming a crease along the front-rear direction in vicinity of an intermediate position of the airbag in an upper-lower direction and folding in half the airbag to cause a lower edge side of the airbag at the time of completion of deployment and inflation to approach an upper edge side of the airbag at the time of completion of deployment and inflation; and the cover sheet may be disposed at a part of the exterior side wall portion, the part being the surface, at the window side, of the gas inflow portion at the time of deployment and inflation.

With this configuration, when the roll-folding of the folded-in-half body is released at an initial stage of deployment at the time of deployment and inflation of the airbag, the folded-in-half body is deployed to cause the surface of the exterior side wall portion in the gas inflow portion of the bag body to sequentially contact the window from the upper portion side to the lower portion side while the roll-folding is released. In this event, since the cover sheet is disposed on the surface of the exterior side wall portion in the gas inflow portion (shielding inflatable portion), the surface facing the window, even if broken pieces of the window are generated when the folded-in-half body is unfolded, the shielding inflatable portion of the gas inflow portion can be appropriately protected from those broken pieces.

In the case of the folded shape described above, the crease of the folded-in-half body of the bag body is unfolded immediately before the entire bag body is unfolded. Accordingly, the lower edge side of the bag body is deployed downward in the interior side and thus the lower edge side of the bag body can be smoothly disposed at the interior side of a portion just below a beltline. As a result, at the time of completion of deployment and inflation, the lower edge side of the bag body can be supported by the lower edge side of the interior side of the window, and therefore, the upper and lower edges of the airbag at the time of completion of inflation can be supported by the upper and lower edges of the interior side of the window. Consequently, even when an occupant is likely to fly out toward the exterior side through the window, the airbag whose upper and lower edges are supported can restrain the occupant in the interior side.

In the head-protecting airbag device according to the above-described aspect of the disclosure, the gas inflow portion of the bag body may be configured such that the inflation gas flows into an area between an interior side wall portion disposed in an interior side of the bag body at a time of completion of deployment and inflation and an exterior side wall portion disposed in an exterior side of the bag body at the time of completion of deployment and inflation; a folded shape of the airbag stored on the side of the upper edge of the window may be such that the airbag is roll-folded so as to be wound toward the exterior side wall portion to cause a lower edge side of the airbag at the time of completion of deployment and inflation to approach an upper edge side of the airbag at the time of completion of deployment and inflation; and the cover sheet may be disposed at a part of the interior side wall portion, the part being the surface, at the window side, of the gas inflow portion at the time of deployment and inflation.

With this configuration, when the roll-folding is released at an initial stage of deployment at the time of deployment and inflation of the airbag, the airbag is deployed to cause the surface of the interior side wall portion in the gas inflow portion of the bag body to sequentially contact the window from the upper portion side to the lower portion side while the roll-folding is released. Since the cover sheet is disposed on the surface of the interior side wall portion in the gas inflow portion (shielding inflatable portion), the surface facing the window, even if broken pieces of the window are generated when the roll-folding is released, the shielding inflatable portion of the gas inflow portion can be appropriately protected from those broken pieces.

In the case of the folded shape described above, when the bag body is unfolded, the bag body behaves to unwind the winding while approaching the exterior side. Therefore, even when a gap between an occupant and the window is small, the bag body can smoothly enter the gap, and thus, the deployment and inflation of the airbag can be completed.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 13 is a diagram for illustrating a state where the folded airbag of the embodiment is removed from the folding bar of the folding machine;

DETAILED DESCRIPTION OF EMBODIMENTS

Figure 1:
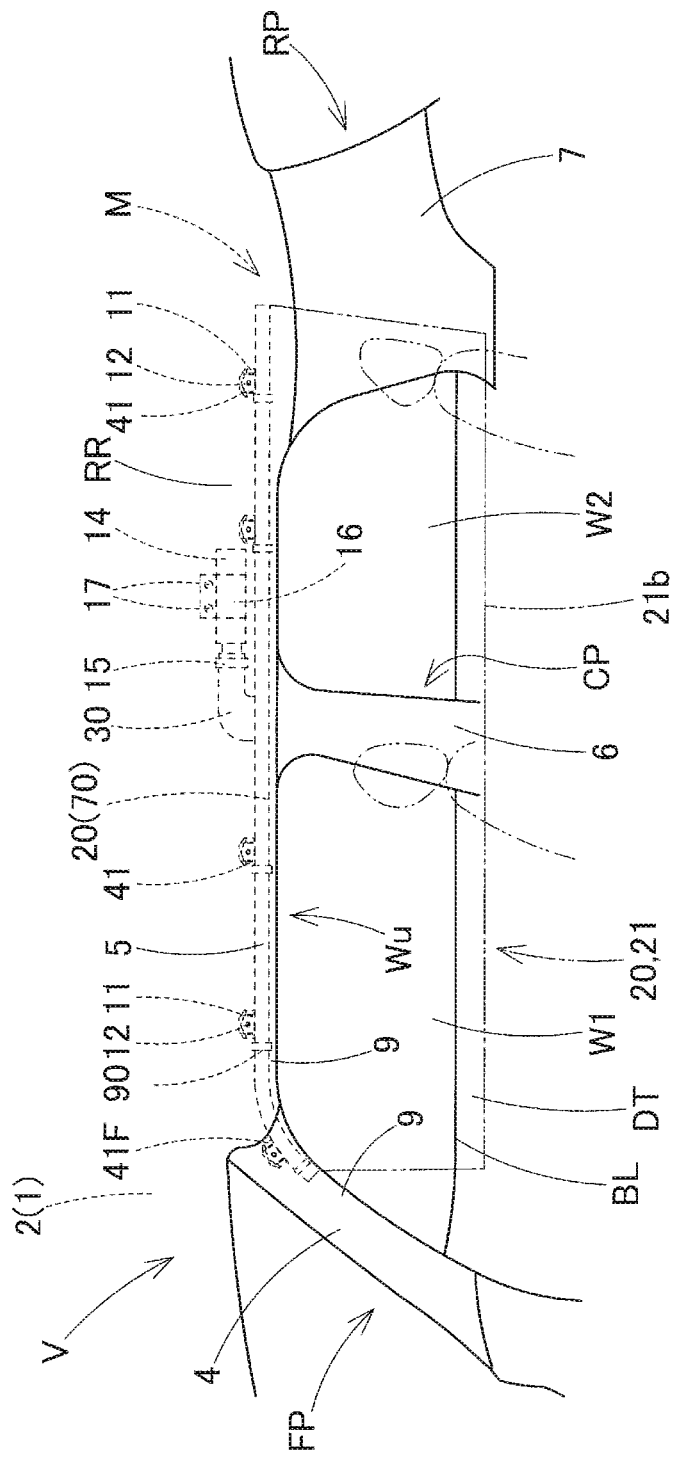
FIG. 1 is a schematic front view of a head-protecting airbag device according to an embodiment of the disclosure, as seen from an interior side.

Hereinafter, an embodiment of the disclosure will be described with reference to the drawings. As shown in FIG. 1, a head-protecting airbag device M of the embodiment is installed in a two-row seat type vehicle V having two windows (side windows) W1 and W2. The head-protecting airbag device M is disposed on a side of an upper edge Wu of the windows W1 and W2 in an interior side of the vehicle V.

The head-protecting airbag device M includes an airbag 20, an inflator 14, fitting brackets 11 and 16, and an airbag cover 9. On the side of the upper edge Wu of the windows W1 and W2 in the interior side of the vehicle V, the airbag 20 is stored in a folded state so as to extend in a front-rear direction from a position on a side of a lower edge of a front pillar portion FP to a region above a rear pillar portion RP, along a lower edge of a roof side rail portion RR.

The airbag cover 9 includes a lower edge of a front pillar garnish 4 disposed at the front pillar portion FP and a lower edge of a roof head lining 5 disposed at the roof side rail portion RR. The front pillar garnish 4 and the roof head lining 5 are made of synthetic resin and fixedly fitted to the interior side I (i.e., the interior side I with respect to the vehicle) of an inner panel 2 of a body 1 (vehicle body) at the front pillar portion FP and the roof side rail portion RR, respectively (see FIG. 7). The airbag cover 9 is configured to cover the interior side I of the airbag 20 stored in a folded state, and to be openable toward the interior side I when the airbag cover 9 is pushed by the airbag 20 such that that the airbag 20 can protrude downward in the interior side I when the airbag 20 is deployed and inflated.

The inflator 14 is configured to supply an inflation gas to the airbag 20. The inflator 14 is of a substantially columnar cylinder type having, at its distal end side, a gas discharge port (not shown) that can discharge the inflation gas. The distal end side, including the vicinity of the gas discharge port, of the inflator 14 is inserted into a connection port portion 30 (to be described later) of the airbag 20, and the inflator 14 is connected to the airbag 20 using a clamp 15 disposed on an outer peripheral side of the connection port portion 30. The inflator 14 is fitted to the inner panel 2 at a position above the window W2 using the fitting bracket 16 configured to hold the inflator 14 and bolts 17 configured to fix the fitting bracket 16 to the inner panel 2 of the body 1. The inflator 14 is electrically connected to a control device (not shown) of the vehicle V via a lead wire (not shown). The inflator 14 is configured to be operated in response to an operation signal input to the inflator 14 from the control device when the control device has detected a side collision, an oblique collision, a rollover, or the like of the vehicle V.

Each of the fitting brackets 11 is formed of two sheet-metal plates, and is fitted to a corresponding one of fitting portions 41 (to be described later) of the airbag 20 such that the fitting bracket 11 holds the fitting portion 41 from front and back sides. The fitting portion 41 is fixedly attached to the inner panel 2 of the body 1 using a bolt 12 (see FIG. 7).

As shown in FIGS. 2 to 5, the airbag 20 includes a bag body 21 and a cover sheet 55.

Figure 8:
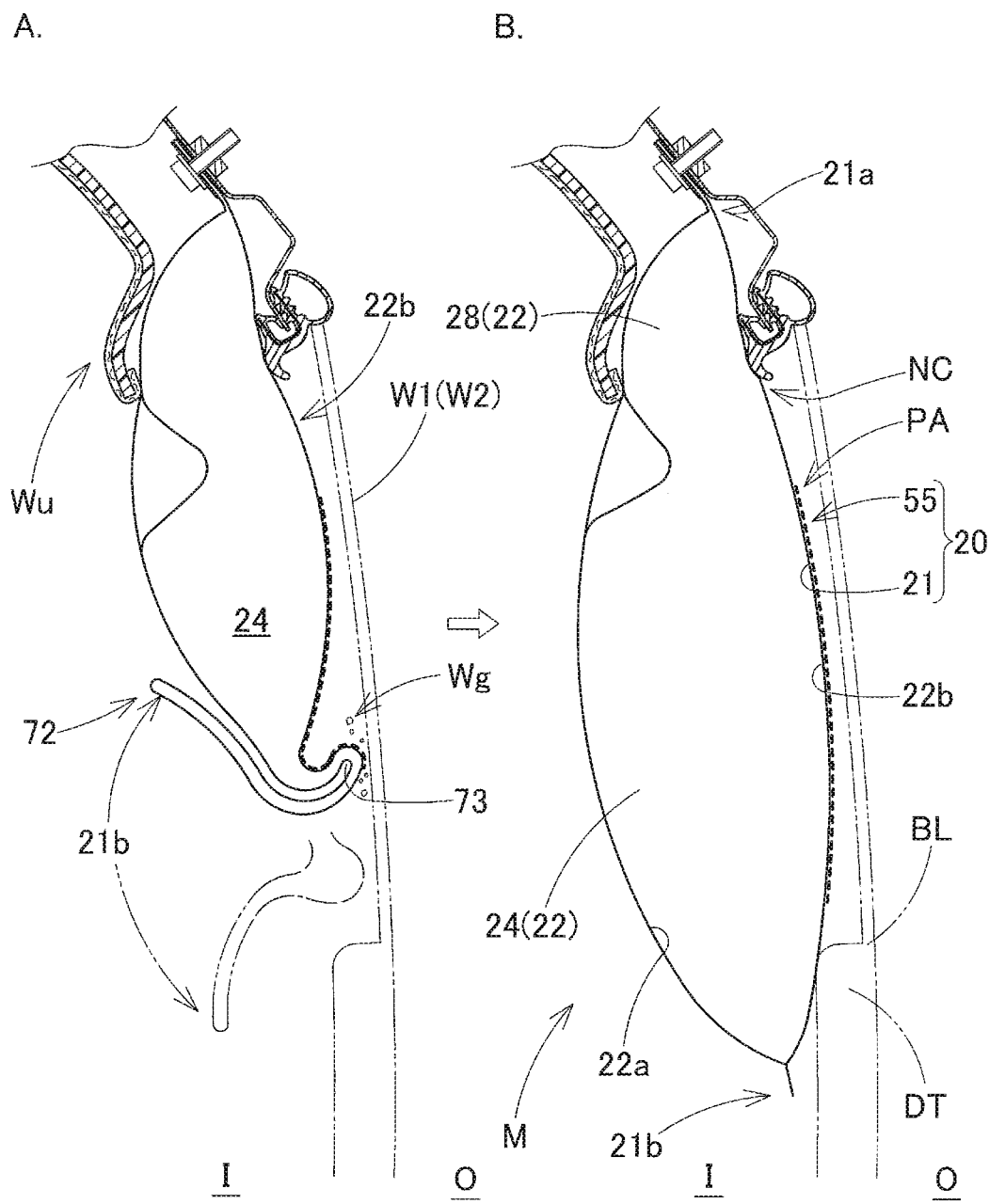
FIG. 8 shows schematic vertical sectional views for sequentially illustrating operating states of the head-protecting airbag device of the embodiment, FIG. 8 showing the operating states after the operating states shown in FIG. 7 occur.

The bag body 21 is configured to be deployed from the folded state when the inflation gas from the inflator 14 flows into the bag body 21, and thus, the bag body 21 covers the interior side I of the windows W1 and W2 and the interior side I of pillar garnishes 6 and 7 of a center pillar portion CP and the rear pillar portion RP. The outer shape of the bag body 21 is a substantially rectangular plate shape having a longitudinal direction substantially parallel to the front-rear direction such that the bag body 21, at the time of completion of inflation, can cover the interior side I of an area from the window W1, via the center pillar portion CP and the window W2, to a front side of the rear pillar portion RP. In the embodiment, as shown in FIGS. 1 and 8, the width of the bag body 21 in the upper-lower direction is set such that a lower edge 21b of the bag body 21 at the time of completion of inflation is located below a beltline BL formed by lower edges of the windows W1 and W2.

Figure 2:
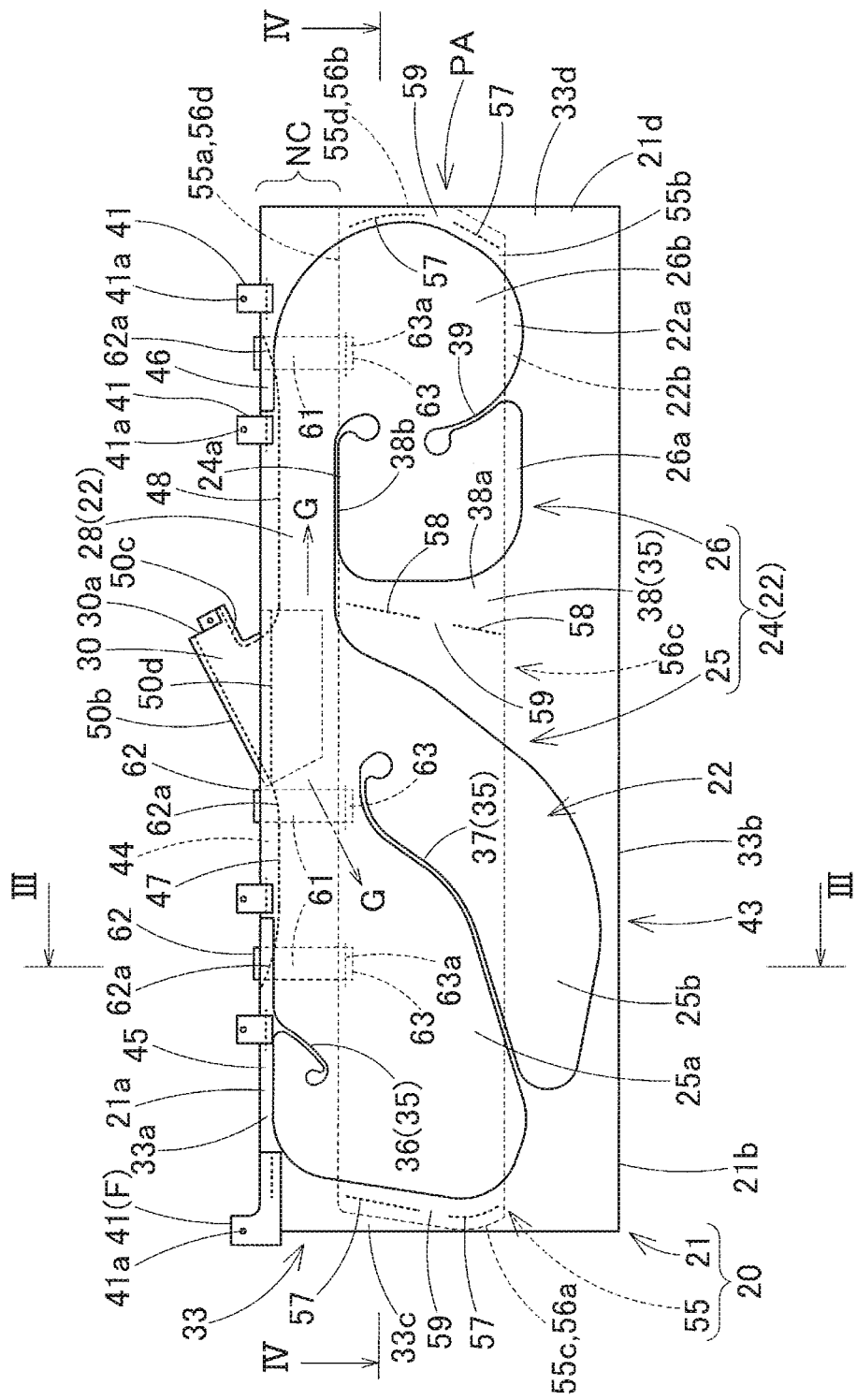
FIG. 2 is a front view showing an airbag used in the embodiment, which is developed flatly.
Figure 3:
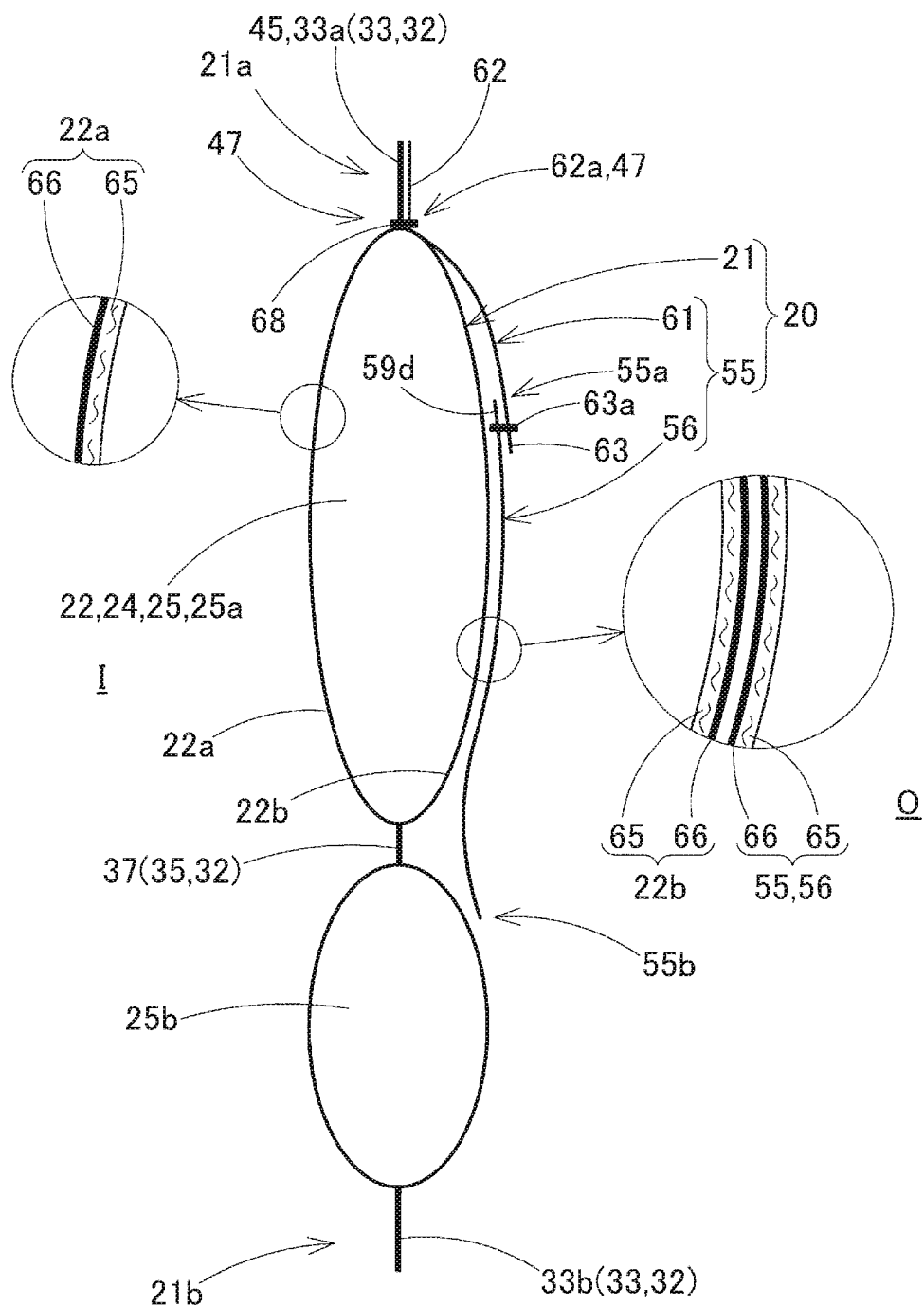
FIG. 3 is a sectional view of the airbag of the embodiment in an inflated state, taken along a line III-III in FIG. 2.
Figure 4:
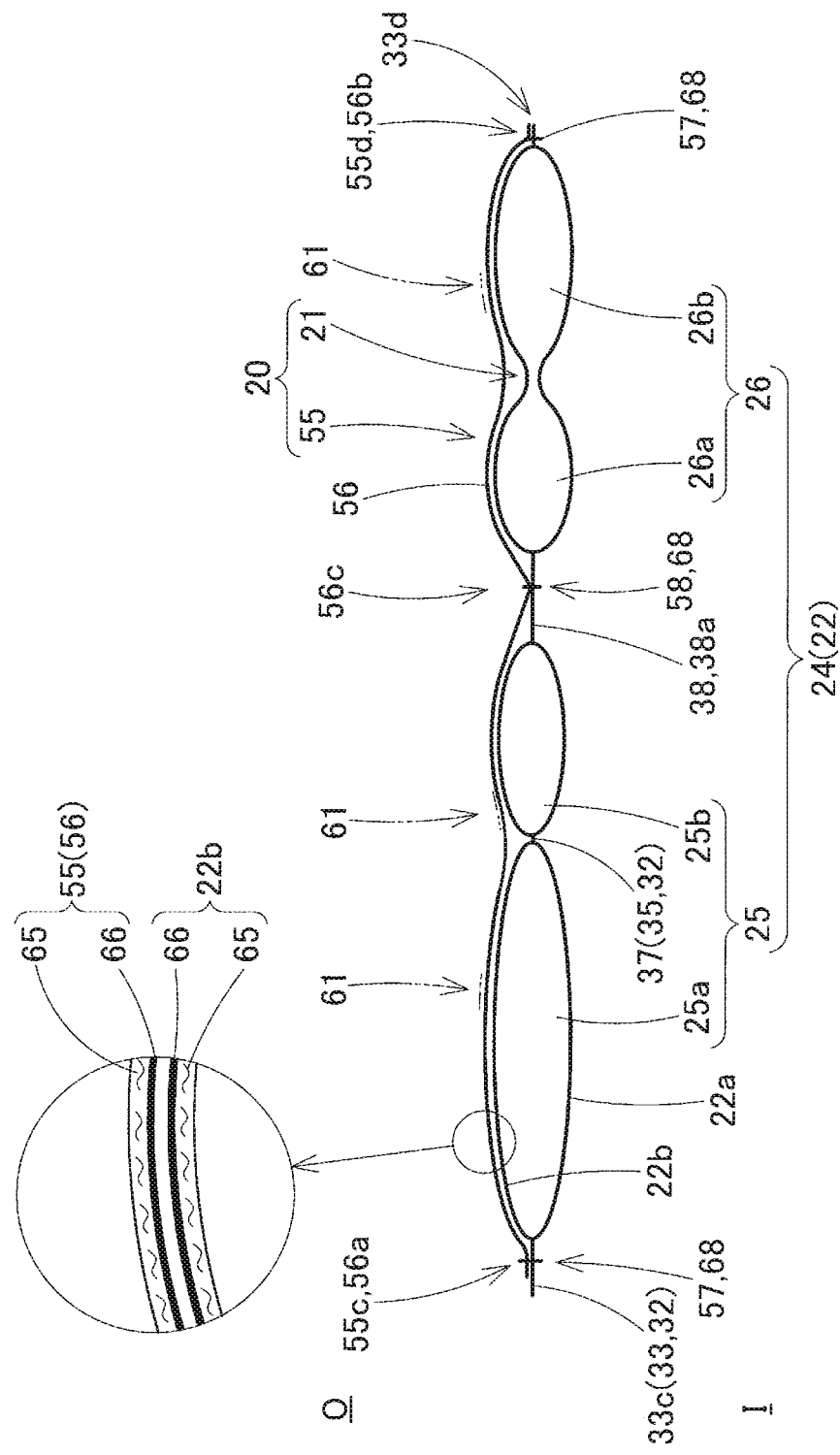
FIG. 4 is a sectional view of the airbag of the embodiment in the inflated state, taken along a line IV-IV in FIG. 2.

In the embodiment, the bag body 21 is formed of a double-woven portion 43 manufactured by double weaving using polyamide yarn, polyester yarn, or the like, except for the connection port portion 30 and the fitting portions 41. As shown in FIGS. 2 to 4, the bag body 21 includes a gas inflow portion 22 that is inflated by allowing the inflation gas to flow into the gas inflow portion 22 such that an interior side wall portion 22a located in the interior side I of the bag body 21 at the time of completion of inflation and an exterior side wall portion 22b located in an exterior side O (i.e., the exterior side O with respect to the vehicle) of the bag body 21 at the time of completion of inflation are separated from each other, and a non-inflow portion 32 that is formed by joining together the interior side wall portion 22a and the exterior side wall portion 22b and thus does not allow the inflation gas to flow into the non-inflow portion 32.

The gas inflow portion 22 includes a gas supply passage portion 28, a shielding inflatable portion 24, and the connection port portion 30. The connection port portion 30 is disposed at an upper edge 21a of the bag body 21 and protrudes upward to be connected to the inflator 14. The gas supply passage portion 28 communicates with the connection port portion 30 and is disposed at the upper edge 21a of the bag body 21 so as to extend in the front-rear direction along the upper edge 21a. The shielding inflatable portion 24 is disposed below the gas supply passage portion 28 and is inflated to cover the interior side I of the windows W1 and W2 and so on when the inflation gas is supplied from the gas supply passage portion 28 to the shielding inflatable portion 24.

The shielding inflatable portion 24 includes a front-side shielding inflatable portion 25 for mainly covering the interior side of the front side window W1 and a rear-side shielding inflatable portion 26 for mainly covering the interior side of the rear side window W2. The front-side shielding inflatable portion 25 includes partial shielding inflatable portions 25a and 25b disposed in the front-rear direction, and the rear-side shielding inflatable portion 26 includes partial shielding inflatable portions 26a and 26b disposed in the front-rear direction.

The connection port portion 30 is inclined upward in a rearward direction with respect to the gas supply passage portion 28 and is open at a rear end 30a to allow insertion of the inflator 14. The connection port portion 30 is connected to the inflator 14 by fitting the clamp 15 on the outer peripheral side of the connection port portion 30 in a state where the inflator 14 is inserted therein.

In a folded body 70 (see FIGS. 6 and 7) formed by folding the airbag 20, the gas supply passage portion 28 and a portion in the vicinity of the gas supply passage portion 28 serve as portions where a bellows-folded portion 76 is formed, the bellows-folded portion 76 being folded in a bellows shape by providing creases 76a and 76b along the front-rear direction.

The non-inflow portion 32 includes a peripheral portion 33 forming an outer peripheral edge of the gas inflow portion 22, partition portions 35 disposed to extend from the peripheral portion 33 into regions of the gas inflow portion 22 so as to partition the shielding inflatable portion 24 into the partial shielding inflatable portions 25a, 25b, 26a, and 26b, and the fitting portions 41 configured to attach the upper edge 21a of the bag body 21 to the body 1 of the vehicle V.

The peripheral portion 33 is a portion formed by upper, lower, front, and rear edges of the rectangular plate-shaped double-woven portion 43 in which the shielding inflatable portion 24 and the gas supply passage portion 28 are disposed, and includes an upper edge 33a, a lower edge 33b, a front edge 33c, and a rear edge 33d. The connection port portion 30 is disposed by sewing at a middle portion in the front-rear direction of the upper edge 33a.

Figure 5:
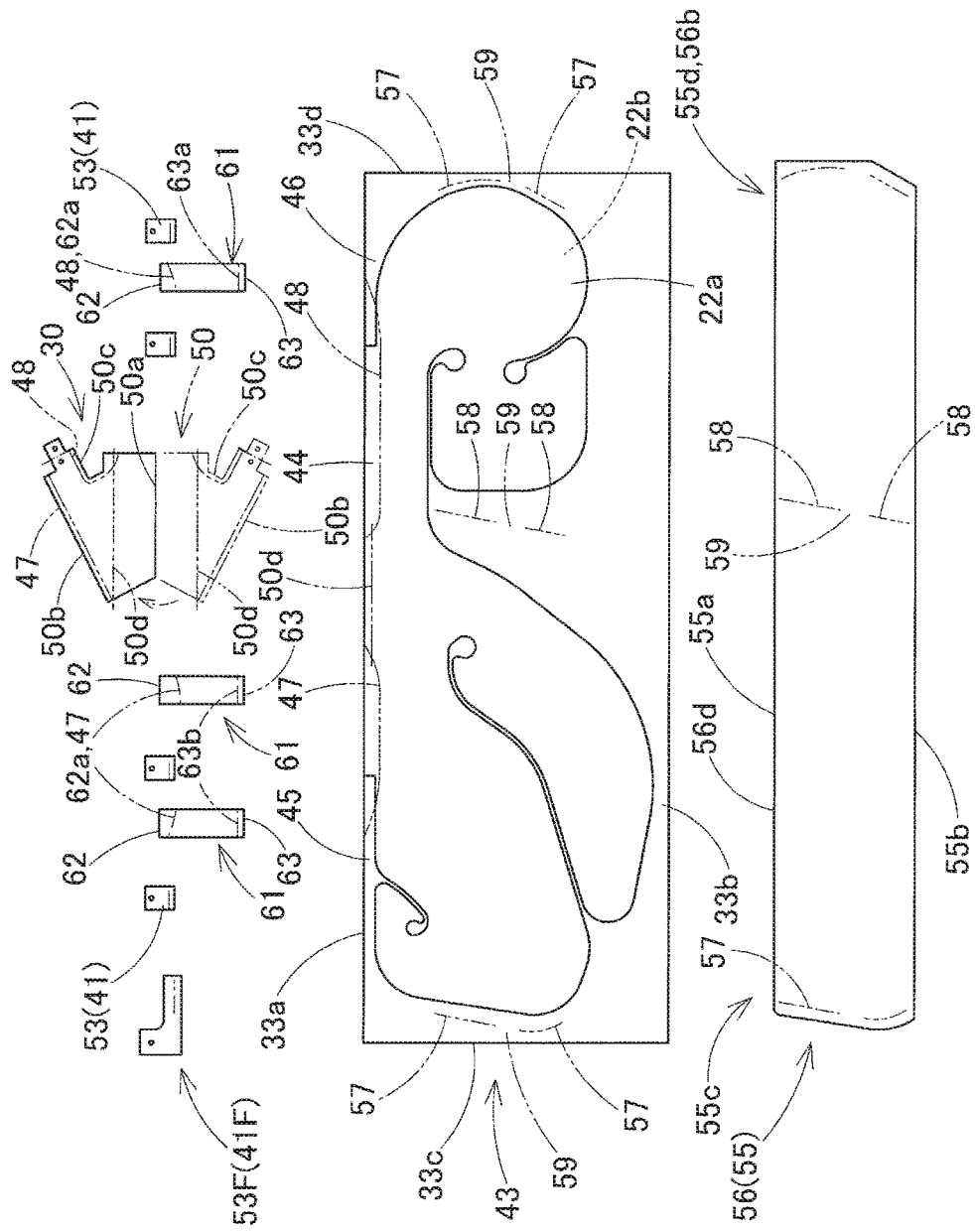
FIG. 5 is a plan view for illustrating components of the airbag of the embodiment.

FIG. 5 shows a state of the double-woven portion 43 formed by double weaving and cut into a predetermined shape (rectangular shape). A connection port portion opening 44 formed by separating the interior side wall portion 22a and the exterior side wall portion 22b from each other is disposed in the middle portion of the upper edge 33a-side. The connection port portion opening 44 is a portion that is open between a front-side closed portion 45 and a rear-side closed portion 46 in the upper edge 33a-side of the peripheral portion 33 of the non-inflow portion 32.

As shown in FIG. 5, the connection port portion 30 is formed using a connection port portion base cloth 50 developed flatly. That is, the connection port portion 30 is disposed as follows. A crease 50a is formed in the connection port portion base cloth 50, and the connection port portion base cloth 50 is folded in half and inserted into the connection port portion opening 44 of the double-woven portion 43, and then overlapping upper edges 50b and rear edges 50c of the folded-in-half connection port portion base cloth 50 are sewn to the double-woven portion 43 at a front-side sewn portion 47 and a rear-side sewn portion 48 respectively extending from the front-side closed portion 45 and the rear-side closed portion 46 along peripheral edges of the connection port portion opening 44 of the double-woven portion 43. Before sewing the connection port portion 30 by the front-side sewn portion 47 and the rear-side sewn portion 48, an interior side portion and an exterior side portion of the connection port portion base cloth 50 to be folded in half are respectively sewn to the interior side wall portion 22a and the exterior side wall portion 22b at the peripheral edges of the connection port portion opening 44 of the double-woven portion 43 by providing sewn portions 50d, thereby ensuring the gas sealability with respect to the interior side wall portion 22a and the exterior side wall portion 22b at the peripheral edges of the connection port portion opening 44 at the connection port portion 30.

The partition portions 35 are formed when the double-woven portion 43 is formed by double-weaving, and include a front-upper partition portion 36 extending downward from the upper edge 33a of the peripheral portion 33 in the vicinity of the front edge 33c and entering the partial shielding inflatable portion 25a, a front-lower partition portion 37 extending upward from the lower edge 33b so as to separate the partial shielding inflatable portions 25a and 25b, a middle partition portion 38 extending upward from a substantially middle portion of the lower edge 33b in the front-rear direction so as to separate the partial shielding inflatable portions 25b and 26a, and a rear-lower partition portion 39 extending upward from the rear edge 33d-side of the lower edge 33b so as to separate the partial shielding inflatable portions 26a and 26b. The middle partition portion 38 includes a vertical bar portion 38a separating the partial shielding inflatable portions 25b and 26a and a horizontal bar portion 38b extending in the front-rear direction (rearward in the embodiment) at an upper end of the vertical bar portion 38a so as to separate the gas supply passage portion 28 and the shielding inflatable portion 24.

As shown in FIG. 5, the fitting portions 41 are disposed by sewing predetermined fitting base clothes 53 to the upper edge 33a-side of the peripheral portion 33. A front-end fitting portion 41F is formed of a fitting base cloth 53F which is longer in the front-rear direction than the other fitting base clothes. Each fitting portion 41 is provided with a fitting hole 41a through which the bolt 12 is inserted for fastening the fitting bracket 11.

As well as the double-woven portion 43, the connection port portion base cloth 50, and the fitting base clothes 53, the cover sheet 55 is formed of a fabric obtained by weaving synthetic fibers such as polyamide fibers. The cover sheet 55 includes a rectangular plate-shaped body 56 and a plurality of (three) belt-shaped support portions 61.

The body 56 has a two-layer structure including a fabric portion 65 formed of a fabric (textile) obtained by weaving synthetic fibers such as polyamide fibers, and a coat portion 66 formed by coating urethane or the like on a surface of the fabric portion 65 for preventing gas leakage. In the embodiment, also for the interior side wall portion 22a and the exterior side wall portion 22b of the double-woven portion 43, coating treatment is carried out after the double weaving for preventing gas leakage so that a coat portion 66 is provided by coating an outer surface of a fabric portion 65 with urethane or the like (see FIG. 3).

The cover sheet 55 is attached to the bag body 21 such that the shielding inflatable portion 24, rather than the gas supply passage portion 28, is a protected area PA, by providing a non-covered area NC in the upper edge 21a-side of the gas inflow portion 22, the non-covered area NC being an area where the cover sheet 55 is not disposed. Further, the cover sheet 55 is disposed at a part of the exterior side wall portion 22b, the part being the surface, at the window W1-W2-side, of the gas inflow portion 22 at the time of deployment and inflation. The surface, at the window W1-W2-side, of the gas inflow portion 22 is the surface of the gas inflow portion 22, the surface facing the windows W1 and W2 at the time of deployment and inflation. In the embodiment, specifically, the body 56 of the cover sheet 55 is disposed in the exterior side O of an intermediate portion of the shielding inflatable portion 24 in the upper-lower direction and covers the exterior side O of the bag body 21 over the entire length from the front edge 33c to the rear edge 33d of the peripheral portion 33 in the bag body 21, exceeding the entire region in the front-rear direction of the shielding inflatable portion 24. The body 56 has a front edge 56a that is sewn to the front edge 33c of the peripheral portion 33 of the bag body 21, a rear edge 56b that is sewn to the rear edge 33d of the peripheral portion 33, and an intermediate portion 56c in the front-rear direction that is sewn to the vertical bar portion 38a of the middle partition portion 38 in the non-inflow portion 32. While sewn portions 57 and 58 that are sewn using sewing threads 68 are disposed to extend in an upper-lower direction, the sewn portions 57 and 58 are each provided with a non-sewn portion 59, which is not sewn, at an intermediate portion in the upper-lower direction so as to be divided in the upper-lower direction.

The three belt-shaped support portions 61 are each joined to an upper edge 56d of the body 56 by providing a sewn portion 63a at a lower end 63, and joined to the upper edge 21a of the bag body 21 by providing a sewn portion 62a at an upper end 62. The sewn portion 62a at the upper end 62 of each support portion 61 is jointly sewn to the bag body 21 using the front-side sewn portion 47 or the rear-side sewn portion 48 that is used when the connection port portion 30 is sewn to the bag body 21.

The cover sheet 55 is attached to the bag body 21 such that the coat portion 66 is disposed on the side of the exterior side wall portion 22b of the bag body 21.

Figure 6:
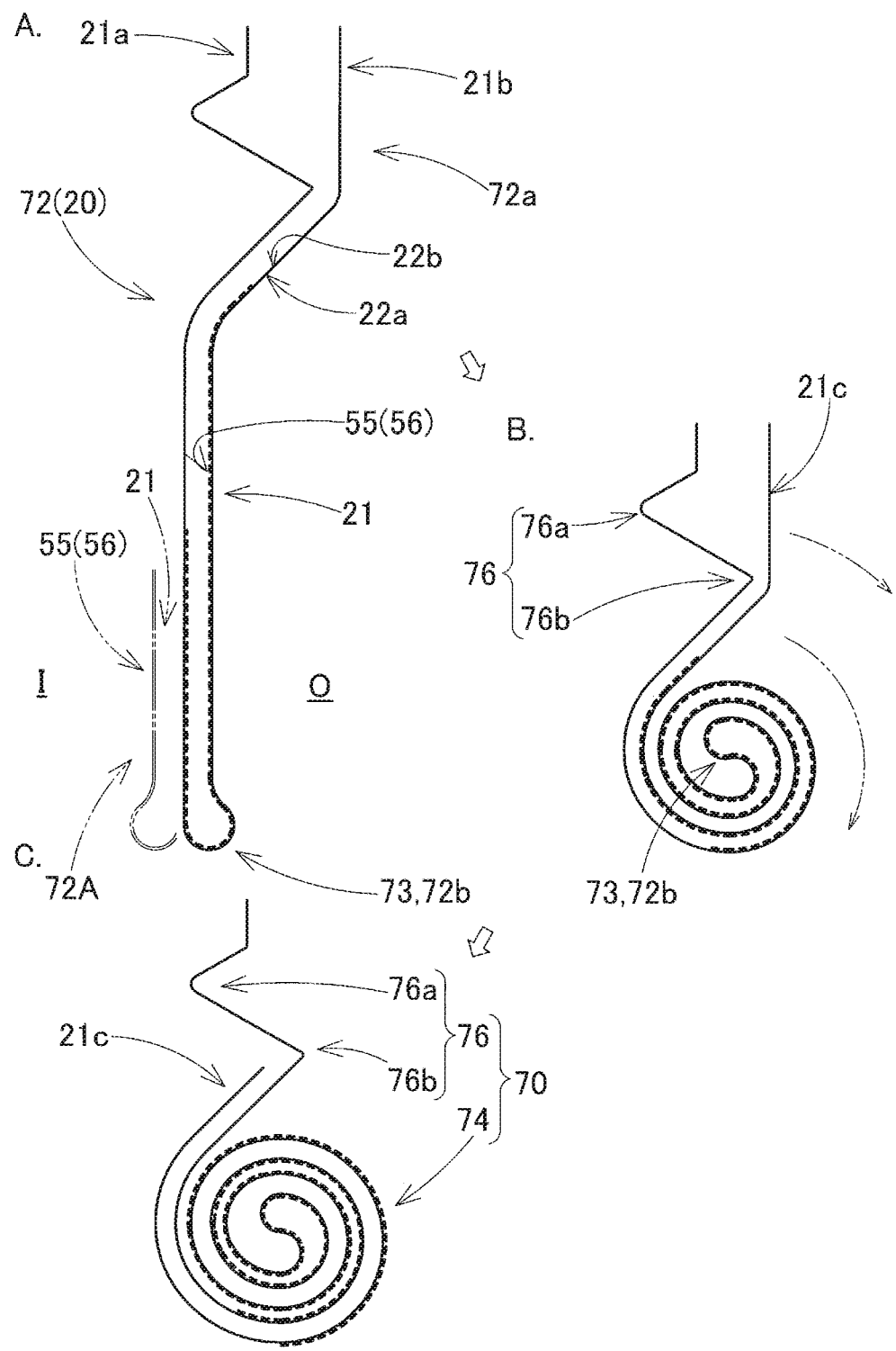
FIG. 6 is a diagram for illustrating a folded shape of the airbag of the embodiment.

As shown in FIG. 6, the folded shape of the airbag 20 can be completed to form the folded body 70 in the following manner: First, a crease 73 extending along the front-rear direction is formed in the bag body 21 in a state where the interior side wall portion 22a and the exterior side wall portion 22b are overlapped together and developed flatly. Thus, the bag body 21 is folded in half so as to cause the lower edge 21b to approach the upper edge 21a, thereby forming a folded-in-half body 72. Then, the folded-in-half body 72 is roll-folded (roll-folded outward) so as to be wound toward the exterior side O of the airbag 20 such that a lower edge 72b-side (the crease 73) of the folded-in-half body 72 is caused to approach an upper edge 72a-side thereof, thereby forming a roll-folded portion 74. Then, while the creases 76a and 76b are formed to form the bellows-folded portion 76 on the upper edge 72a-side, the lower edge 21b-side of the bag body 21 is wound back by half a turn so as to be received in the crease 76b of the bellows-folded portion 76. In this way, the folded body 70 can be formed.

The body 56 of the cover sheet 55 is disposed at a part of the exterior side wall portion 22b, which is the surface at the window W1-W2-side of the gas inflow portion 22 at the time of deployment and inflation. That is, in the embodiment, the body 56 of the cover sheet 55 is disposed in an area of the exterior side wall portion 22b, the area having a width extending upward and downward from the vicinity of the crease 73 (the lower edge 72b) of the folded-in-half body 72 (see FIGS. 3 and 6). In the embodiment, a width Bu extending upward (to the upper edge 21a excluding the fitting portions 41) from the crease 73 is set to be greater than a width Bd extending downward (to the lower edge 21b) from the crease 73 (see FIG. 9). In other words, a lower edge 55b of the cover sheet 55 (the body 56) is disposed above the lower edge 21b of the bag body 21, while an upper edge 55a excluding the support portions 61 (the upper edge 56d of the body 56) is disposed in the vicinity of the horizontal bar portion 38b of the middle partition portion 38 (in the vicinity of an upper edge 24a of the shielding inflatable portion 24) in the vicinity of a lower edge of the gas supply passage portion 28.

Figure 9:
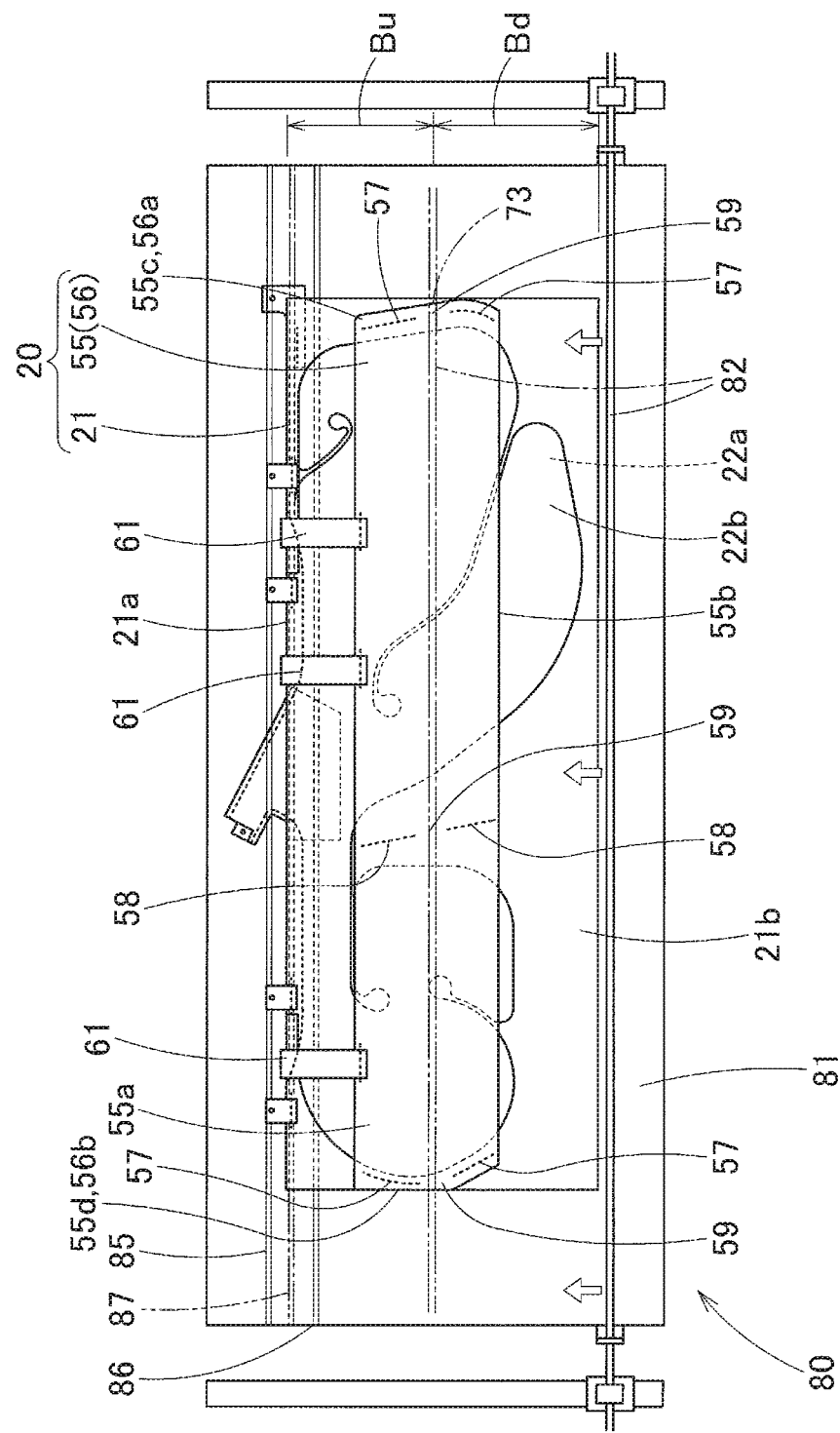
FIG. 9 is a schematic plan view of a folding machine used in a folding process for the airbag of the embodiment.

The airbag 20 of the embodiment is folded using a folding machine 80 shown in FIG. 9.

As shown in FIG. 9, the folding machine 80 includes a setting table 81 on which the airbag 20 developed flatly is placed with the interior side wall portion 22a facing downward, a substantially cylindrical folding bar 82 that is disposed along the front-rear direction of the airbag 20 to be roll-folded, and rectangular plate-shaped folding plates 85, 86, and 87 that are vertically movable for bellows folding and are disposed along the front-rear direction.

The folding bar 82 is provided with a plurality of vent holes 83 extending through inner and outer peripheries of the folding bar 82 (see FIGS. 12 and 13), and sucks and discharges the air A through the vent holes 83. The folding bar 82 is configured to be movable above the setting table 81 in parallel with the setting table 81 from the lower edge 21b-side to the upper edge 21a-side of the bag body 21 while rotating such that the roll-folded portion 74 can be formed. The folding plates 85 and 86 are disposed so as to be protrudable upward from the setting table 81. In addition, the folding plate 87 is disposed to be able to press, from above, the position of the bellows-folding crease 76a extending along the front-rear direction in the set bag body 21. The folding plate 86 is disposed so as to push up, from below, the position of the bellows-folding crease 76b extending along the front-rear direction in the set bag body 21.

Figure 10:
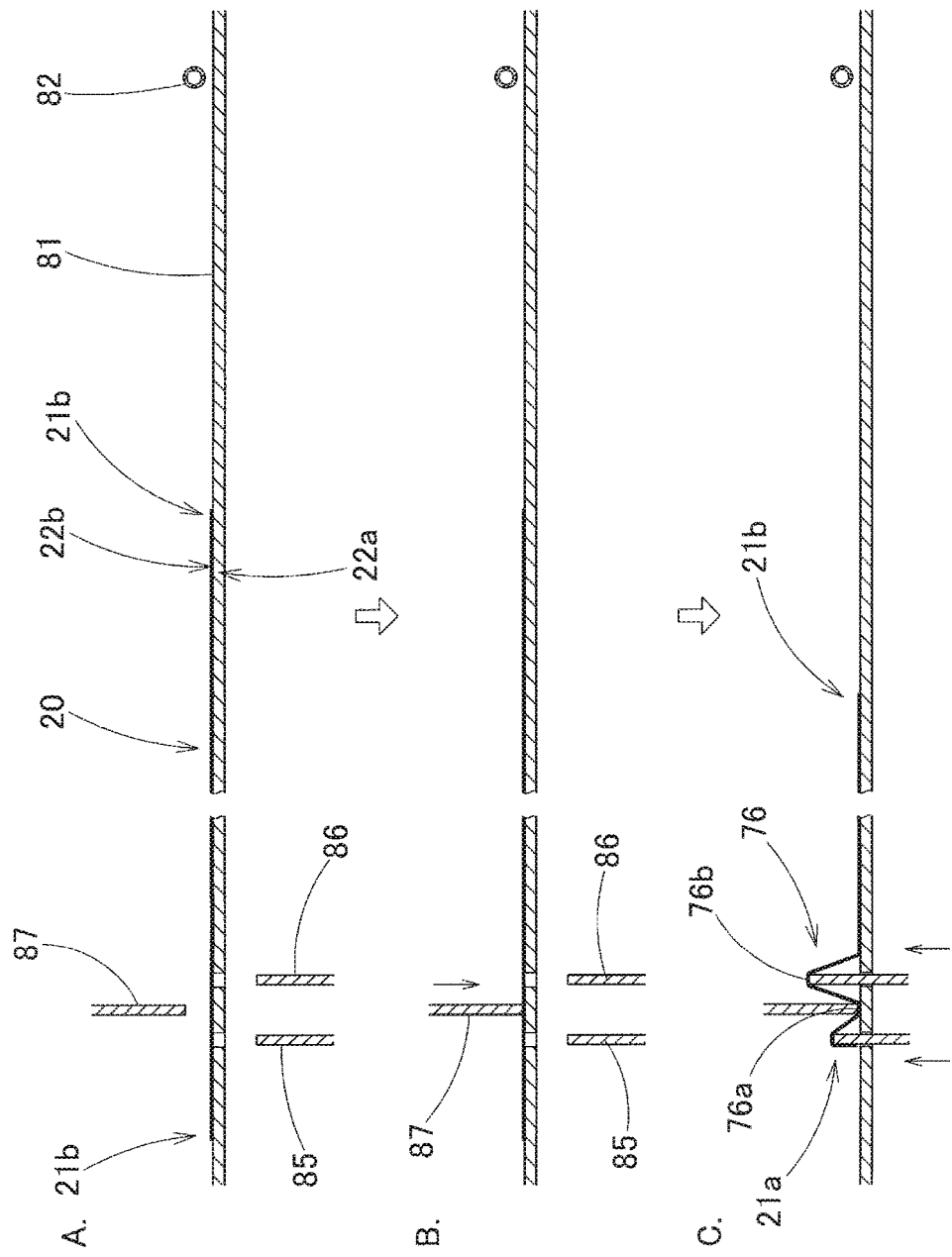
FIG. 10 is a diagram for sequentially illustrating the folding process for the airbag of the embodiment.

The folding process for the airbag 20 using the folding machine 80 will be described. First, as shown in FIG. 9 and FIG. 10 at A, the airbag 20 is set on an upper surface of the setting table 81 with the interior side wall portion 22a facing downward and with the fabric portion 65 of the cover sheet 55 facing upward. Then, as shown in FIG. 10 at B, the folding plate 87 is lowered to hold the crease 76a between the setting table 81 and the folding plate 87. Then, as shown in FIG. 10 at C, the folding plates 85 and 86 are raised to bend the upper edge 21a-side of the bag body 21 so that the creases 76a and 76b of the bellows-folded portion 76 can be easily formed.

Figure 11:
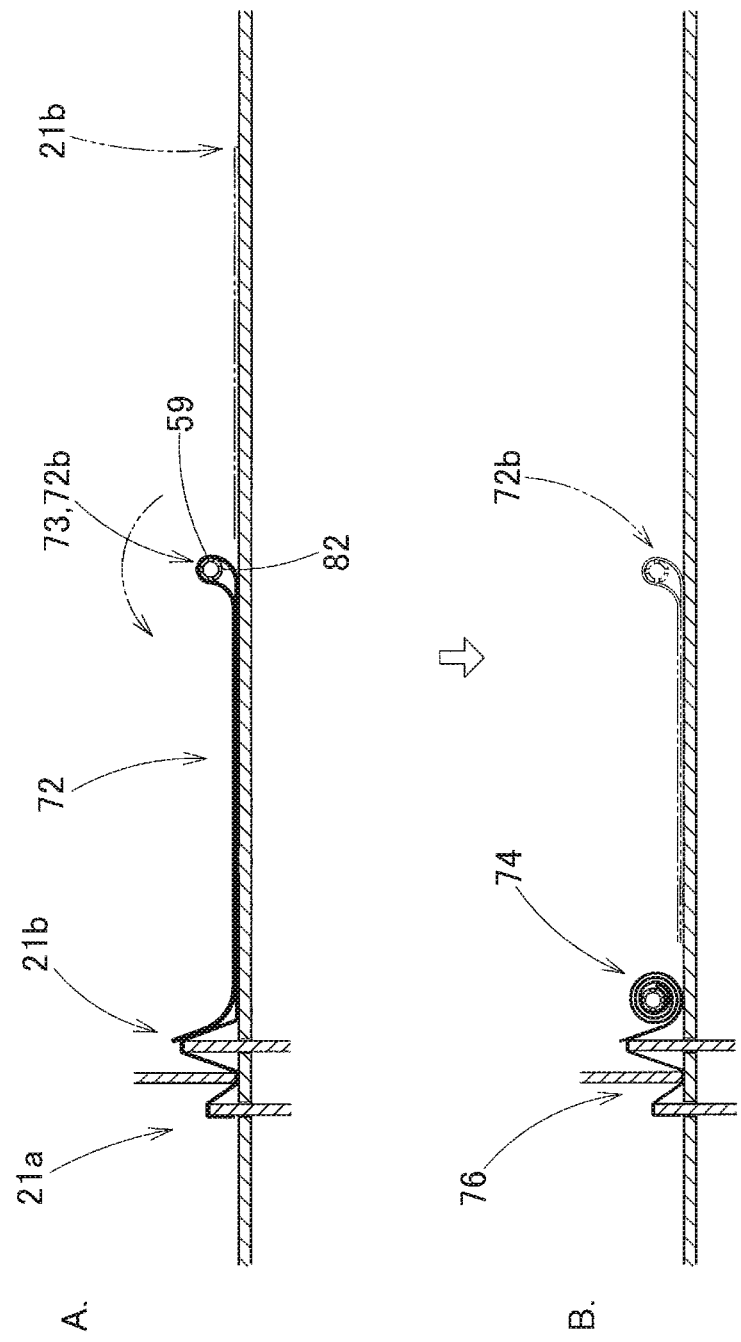
FIG. 11 is a diagram for sequentially illustrating the folding process for the airbag of the embodiment, FIG. 11 showing states after the states shown in FIG. 10 occur.
Figure 12:
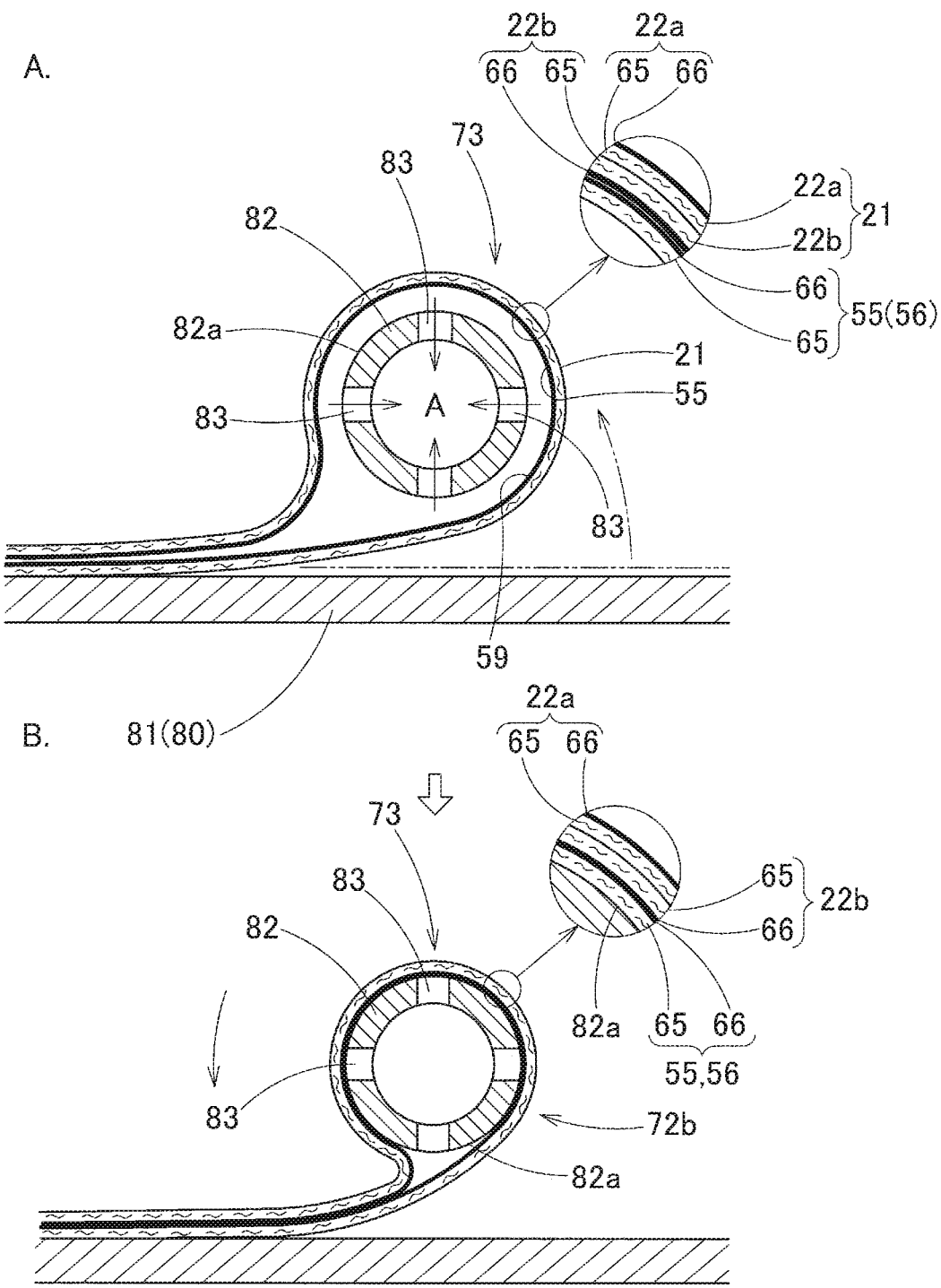
FIG. 12 is a diagram for illustrating a state where a lower edge-side of the airbag of the embodiment is wound around a folding bar.

Thereafter, as shown in FIG. 11 at A and FIG. 12 at A, the folding bar 82 is disposed above the vicinity of the non-sewn portions 59 of the cover sheet 55, and the bag body 21 is folded in half so as to cause the lower edge 21b to approach the upper edge 21a while the folding bar 82 is wrapped, and thus, the folded-in-half body 72 is formed. Then, by rotating the folding bar 82 in a counterclockwise direction as shown in FIG. 11 at A and FIG. 12 at B while sucking the air A through the vent holes 83, the bag body 21 is wound around the folding bar 82 such that the lower edge 72b-side of the folded-in-half body 72 is roll-folded outward, that is, the lower edge 72b-side of the folded-in-half body 72 is wound toward the exterior side O (see FIG. 6).

Then, in the state where the roll-folded portion 74 is wound around the folding bar 82 as shown in FIG. 11 at B, the folding plates 85, 86, and 87 of the folding machine 80 are separated (moved away) from the airbag 20 while the airbag 20 is held so as to press the bellows-folded portion 76 toward the roll-folded portion 74. Then, as shown in FIG. 13 at A and B, the airbag 20 is pulled out of the folding bar 82 while the air A is discharged through the vent holes 83 of the folding bar 82, and then the lower edge 21b-side is wound back so as to be placed in the crease 76b. Thus, the folding is completed. Thereafter, wrapping members 90 (see FIG. 1) such as tapes for collapse prevention that are breakable when the airbag 20 is inflated are wound around predetermined portions. Thus, the folded body 70 of the airbag 20 is formed.

Thereafter, the inflator 14, to which the fitting bracket 16 has been attached, is connected to the connection port portion 30 of the airbag 20 using the clamp 15, and the fitting brackets 11 are fixed to the fitting portions 41. Thus, an airbag assembly is formed.

Then, the fitting brackets 11 and 16 are disposed at the predetermined positions of the inner panel 2 of the body 1 and fixed thereto by the bolts 12 and 17, and the lead wire (not shown) extending from the predetermined control device for inflator operation is connected to the inflator 14. Then, the front pillar garnish 4 and the roof head lining 5 are attached to the inner panel 2 of the body 1, and further the pillar garnishes 6 and 7 are attached to the inner panel 2 of the body 1. Thus, the head-protecting airbag device M is installed in the vehicle V.

After the head-protecting airbag device M of the embodiment is installed in the vehicle V, when the inflator 14 is operated in response to an operation signal sent from the control device upon the occurrence of a side collision, an oblique collision, or a rollover of the vehicle V, an inflation gas G (see FIG. 2) discharged from the inflator 14 flows into the bag body 21. Thus, the inflated bag body 21 breaks the wrapping members 90 and further pushes open the airbag cover 9 formed by the lower edges of the front pillar garnish 4 and the roof head lining 5 such that the inflated bag body 21 protrudes downward, and as shown by an alternate long and two short dashes line in FIG. 1 and in FIGS. 7 and 8, the bag body 21 is greatly inflated to cover the interior side I of the windows W1 and W2, the center pillar portion CP, and the rear pillar portion RP.

Figure 7:
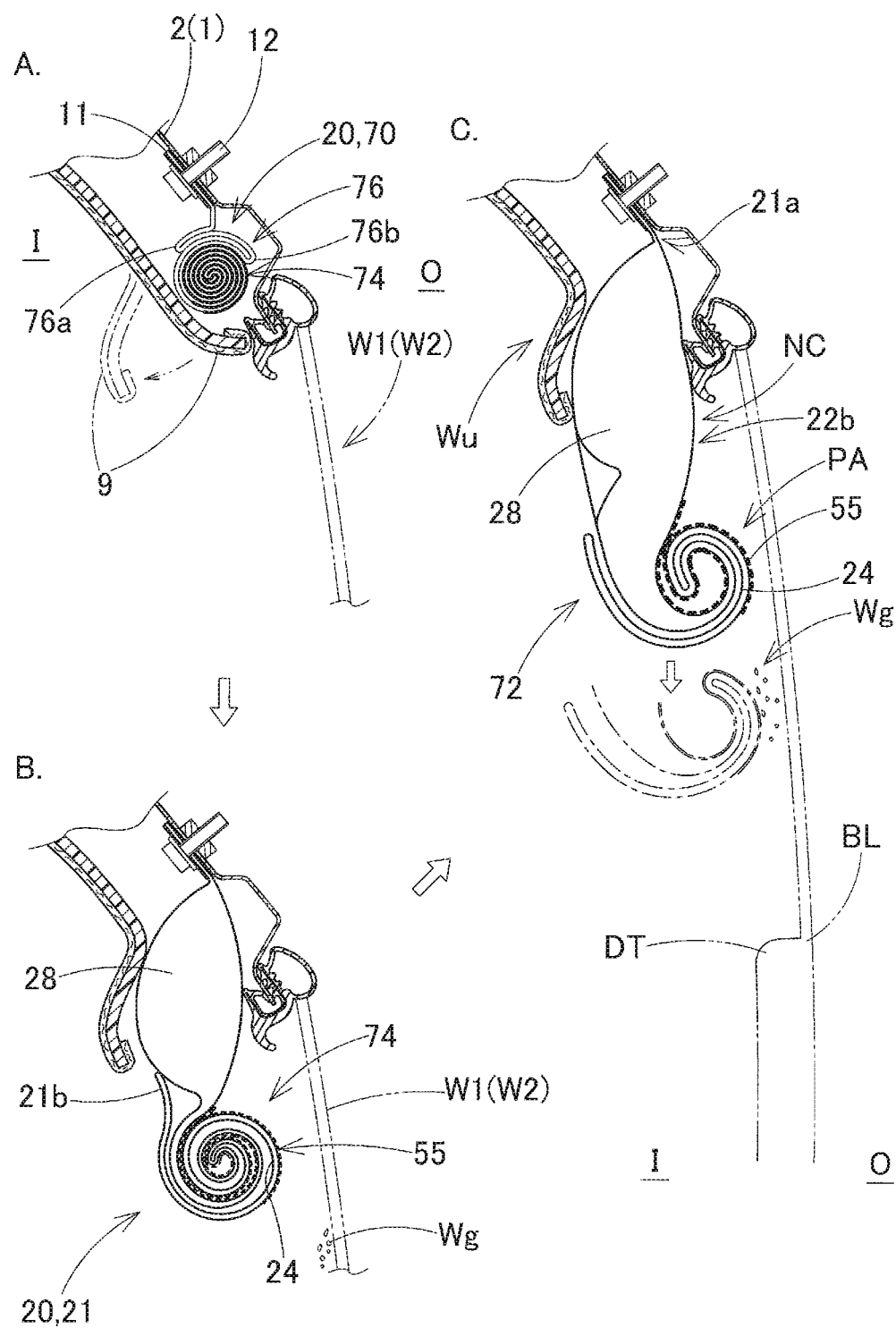
FIG. 7 shows schematic vertical sectional views for sequentially illustrating operating states of the head-protecting airbag device of the embodiment.

In that event, when the airbag 20 is deployed and inflated, first, the roll-folding of the folded-in-half body 72 is released. At this time, while the roll-folding is released, the surface of the exterior side wall portion 22b in the gas inflow portion 22 of the bag body 21 is caused to sequentially contact the windows W1 and W2 from the upper portion side to the lower portion side as shown in FIG. 7 at A to C and FIG. 8 at A and B. Since the cover sheet 55 is disposed on the surface of the exterior side wall portion 22b of the shielding inflatable portion 24 of the gas inflow portion 22, the surface facing the windows W1 and W2, even if broken pieces Wg of the windows W1 and W2 are generated when the folded-in-half body 72 is unfolded, the shielding inflatable portion 24 of the gas inflow portion 22 can be appropriately protected from the broken pieces Wg.

In particular, the cover sheet 55 is disposed so as not to cover the gas supply passage portion 28 where the inflation gas initially flows and the vicinity of the gas supply passage portion 28, i.e., the upper edge 21a-side of the bag body 21, as the non-covered area NC. The cover sheet 55 is disposed to mainly cover the shielding inflatable portion 24, as the protected area PA, i.e., the shielding inflatable portion 24 is set as the protected area PA. Accordingly, since it is not necessary to cover the entire region of the gas inflow portion 22 in the upper-lower direction, it is possible to reduce the amount of the material of the cover sheet 55 so that the cover sheet 55 can be efficiently disposed.

The gas supply passage portion 28 is disposed on the upper edge 21a-side of the bag body 21, and the inflation gas G flowing into the gas inflow portion 22 initially flows into the gas supply passage portion 28. The gas supply passage portion 28 pushes out the shielding inflatable portion 24, which is to cover the windows W1 and W2, downward from a position on the side of the upper edge Wu of the windows W1 and W2, that is, from a storage portion for the airbag 20. Accordingly, the gas supply passage portion 28 is an area that is unlikely to contact the windows W1 and W2. Therefore, even when the gas supply passage portion 28 is not covered with the cover sheet 55, that is, even when contact between the gas supply passage portion 28 and the broken pieces Wg of the windows W1 and W2 is not taken into account, no hindrance occurs.

Therefore, in the head-protecting airbag device M of the embodiment, the cover sheet 55 is disposed at the appropriate position and can efficiently protect the gas inflow portion 22 of the airbag 20 that is deployed and inflated from the position on the side of the upper edge Wu of the windows W1 and W2.

In the embodiment, the cover sheet 55 is attached to the bag body 21 by the support portions 61 and the edge sewn portions 57. The support portions 61 protrude upward at intervals along the upper edge 21a-side of the bag body 21 and the upper end 62-sides of the support portions 61 are sewn to the upper edge 21a-side of the bag body 21. The edge sewn portions 57 are respectively sewn to both front and rear edges of the bag body 21.

Therefore, in the embodiment, since downward displacement of the cover sheet 55 (the body 56) with respect to the bag body 21 can be restricted by the plurality of support portions 61 sewn to the upper edge 21a-side of the bag body 21, the cover sheet 55 can smoothly cover the shielding inflatable portion 24 of the protected area PA when the airbag 20 is deployed and inflated. The shielding inflatable portion 24, which protrudes downward from the position on the side of the upper edge Wu of the windows W1 and W2 at the time of deployment and inflation, may be about to move the cover sheet 55 downward due to its inertia, the cover sheet 55 covering the shielding inflatable portion 24. However, the support portions 61 can restrict this movement. Also after completion of inflation, the support portions 61 can prevent behavior of the cover sheet 55, that is, the behavior of protruding from the bag body 21 and hanging downward. Further, in a case where the configuration in which the cover sheet 55 is attached to the bag body 21 by sewing is employed, when the bag body 21 has the same configuration and only the folded shape is changed such that a portion facing the windows at the time of deployment and inflation is changed as in a later-described airbag 20A (see FIG. 16), a cover sheet 55A having a predetermined shape may be attached to a protected area PA of the bag body 21 by sewing. Thus, it is possible to easily cope with a change in folded shape or the like.

Further, in the embodiment, the bag body 21 includes the double-woven portion 43 formed by double weaving, and the connection port portion 30 in the upper edge 21a-side of the bag body 21, the connection port portion 30 being connected to the inflator 14 configured to supply the inflation gas. The connection port portion 30 is disposed by sewing at the opening 44 in the double-woven portion 43, the opening 44 being located in the upper edge 21a-side of the bag body 21. The support portions 61 of the cover sheet 55 are jointly sewn to the bag body 21 when the connection port portion 30 is sewn at the opening 44 of the bag body 21 (the double-woven portion 43). In other words, the support portions 61 are sewn to the bag body 21 by forming the sewn portion 62a at the upper end 62 of each support portion 61 with the use of the front-side sewn portion 47 or the rear-side sewn portion 48.

Therefore, in the embodiment, since the support portions 61 of the cover sheet 55 can be joined to the bag body 21 simultaneously with sewing of the connection port portion 30 during the manufacturing of the bag body 21, the operation of joining the cover sheet 55 to the bag body 21 can be efficiently carried out. Further, sewing of both front and rear edges 55c and 55d (56a and 56b) of the cover sheet 55 to the bag body 21 can be also carried out simultaneously in this sewing process, so that the operation of joining the cover sheet 55 to the bag body 21 can be further efficiently carried out.

In the embodiment, the sewn portion 58 of the intermediate portion 56c in the front-rear direction of the cover sheet 55 can also be formed simultaneously with sewing of both front and rear edges 55c and 55d (56a and 56b) to the bag body 21, and thus, the improvement of efficiency in the joining operation is not impeded. Since the cover sheet 55 is joined to the bag body 21 also at the intermediate portion 56c in the front-rear direction, it is possible to appropriately prevent downward displacement of the intermediate portion in the front-rear direction of the cover sheet 55 with respect to the bag body 21.

In the embodiment, the cover sheet 55 is disposed to be able to cover substantially the entire region of the gas inflow portion 22 of the bag body 21 along the front-rear direction.

Therefore, in the embodiment, while the bag body 21 is formed by disposing the plurality of partial shielding inflatable portions 25a, 25b, 26a, and 26b of the shielding inflatable portion 24 in the front-rear direction, those plurality of partial shielding inflatable portions 25a, 25b, 26a, and 26b can be covered with the single cover sheet 55. As compared to a case where a plurality of cover sheets are disposed to individually cover the plurality of partial shielding inflatable portions 25a, 25b, 26a, and 26b, i.e., a case where cover sheets in a number corresponding to the number of the partial shielding inflatable portions 25a, 25b, 26a, and 26b are prepared and those cover sheets are joined to the bag body 21, the cover sheet management and joining operation are required only for the single cover sheet 55, and thus, the airbag 20 can be efficiently manufactured.

In the case of the folded shape of the folded body 70 of the embodiment, as shown in FIG. 8 at A and B, the crease 73 of the folded-in-half body 72 is unfolded immediately before the entire bag body 21 is unfolded, and accordingly, the lower edge 21b-side of the bag body 21 is deployed downward in the interior side I. Thus, the lower edge 21b-side of the bag body 21 can be smoothly disposed at the interior side I of a portion just below the beltline BL. As a result, at the time of completion of deployment and inflation, the lower edge 21b-side of the bag body 21 can be supported by a lower edge (door trims) DT of the interior side I of the windows W1 and W2. In addition, the airbag 20 is supported on the inner panel 2 by the fitting portions 41 at the upper edge 21a-side. Thus, the upper and lower edges 21a and 21b of the airbag 20 at the time of completion of inflation can be supported by the upper and lower edges of the interior side I of the windows W1 and W2. Consequently, even when an occupant is about to fly out to the exterior side O of the vehicle V through the window W1 or W2, the airbag 20 whose upper and lower edges 21a and 21b are supported can restrain the occupant in the interior side I of the vehicle V.

In the embodiment, when the folded-in-half body 72 is formed, the lower edge 21b-side of the bag body 21 is folded toward the exterior side wall portion 22b-side, and immediately before completion of roll folding to form the roll-folded portion 74, the lower edge 21b-side is placed in the crease 76b of the bellows-folded portion 76. However, as shown by an alternate long and short dashes line in FIG. 6 at A, the lower edge 21b-side may be folded toward the interior side wall portion 22a-side to form a folded-in-half body 72A, and then the folded-in-half body 72A may be roll-folded outward, i.e., toward the exterior side O such that its lower edge 72b is caused to approach its upper edge 72a. In this case, a roll-folded portion 74 can be formed even without placing the lower edge 21b in the crease 76b of the bellows-folded portion 76.

Figure 14:
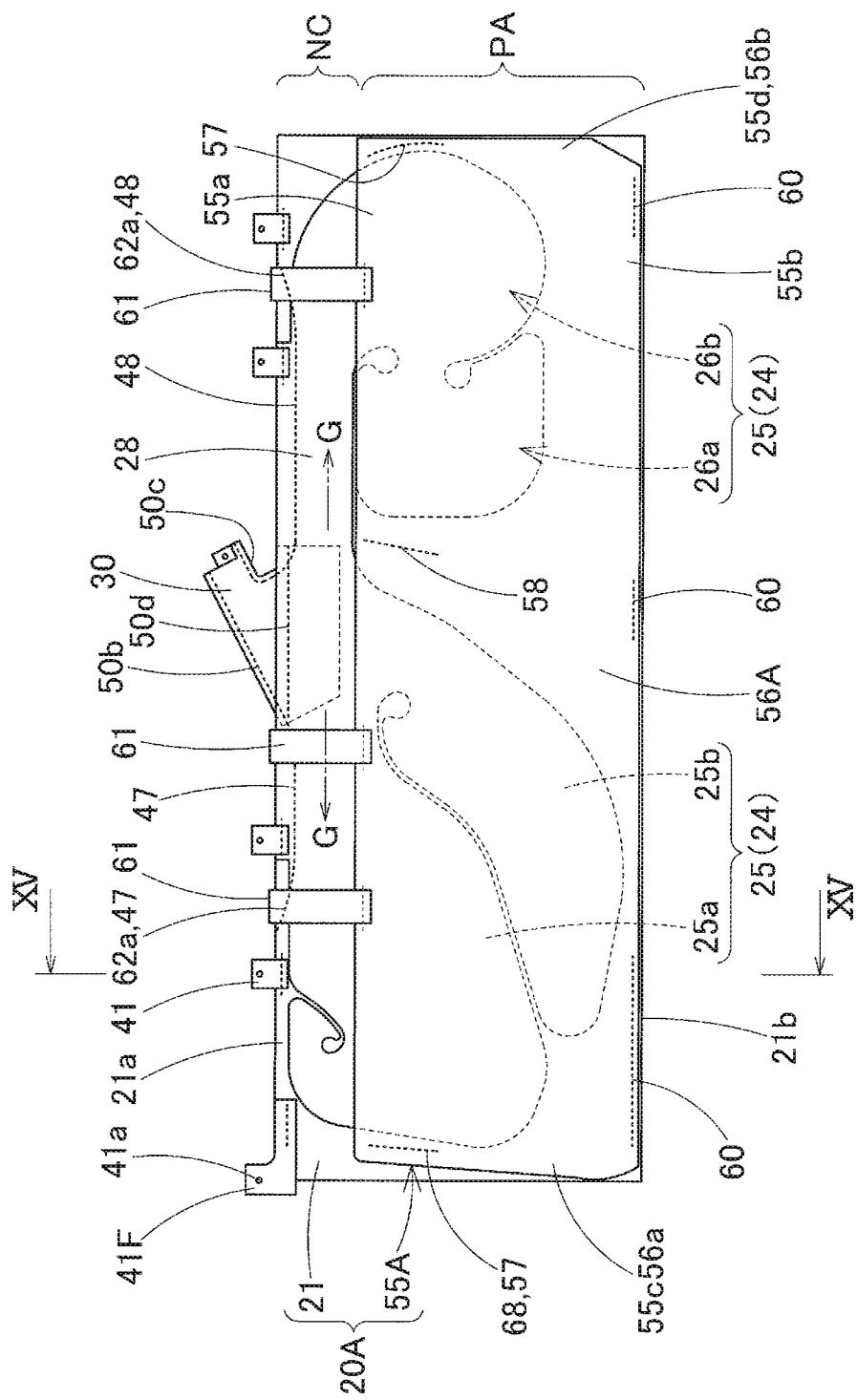
FIG. 14 is a front view showing an airbag of a modified example that is developed flatly.
Figure 15:
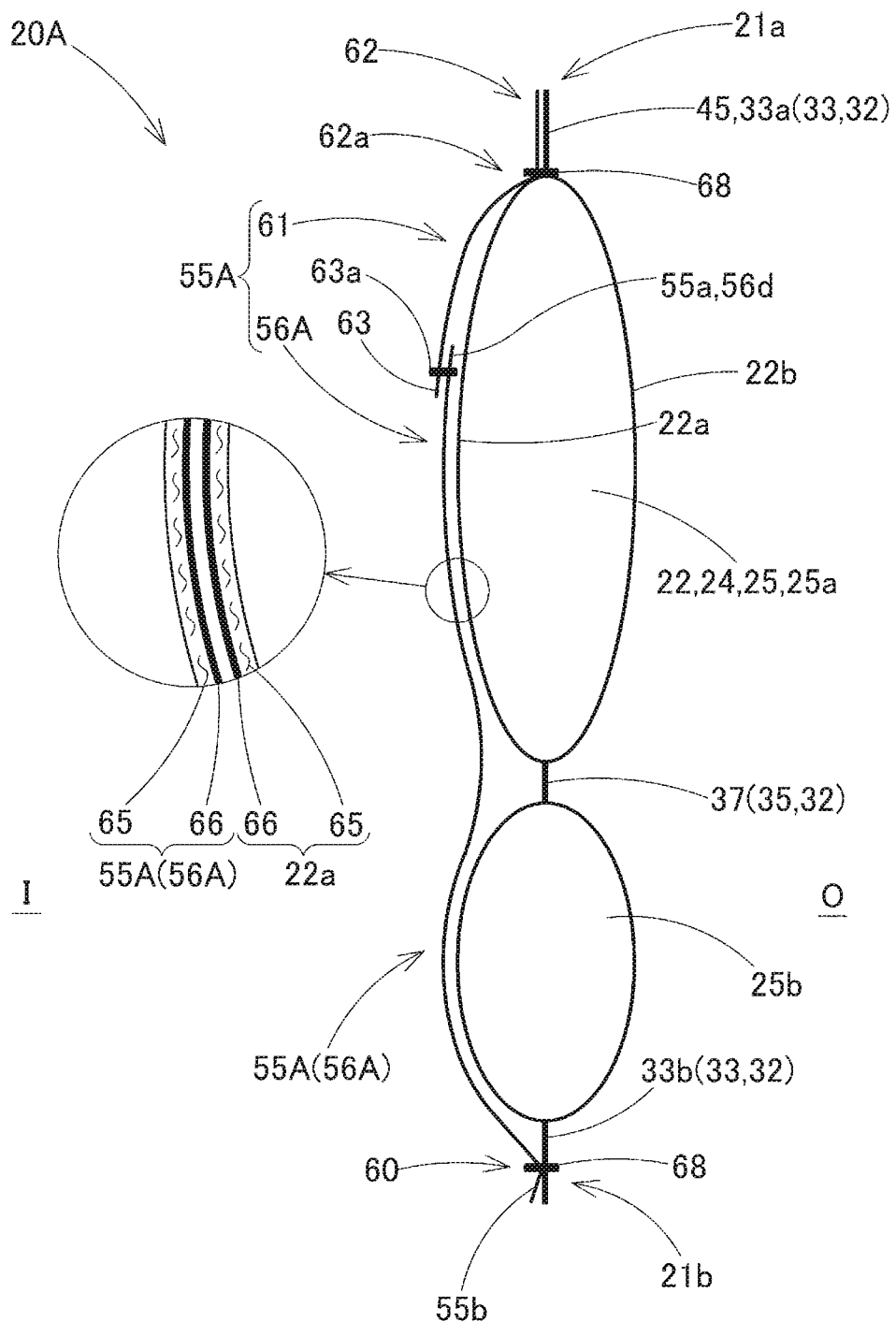
FIG. 15 is a sectional view of the inflated airbag of the modified example, taken along a line XV-XV in FIG. 14.

In the embodiment, the cover sheet 55 is disposed to cover the exterior side wall portion 22b in the gas inflow portion 22 of the bag body 21. However, as in an airbag 20A shown in FIGS. 14 and 15, a cover sheet 55A may be disposed to cover the interior side wall portion 22a in the gas inflow portion 22 of the bag body 21.

Figure 16:
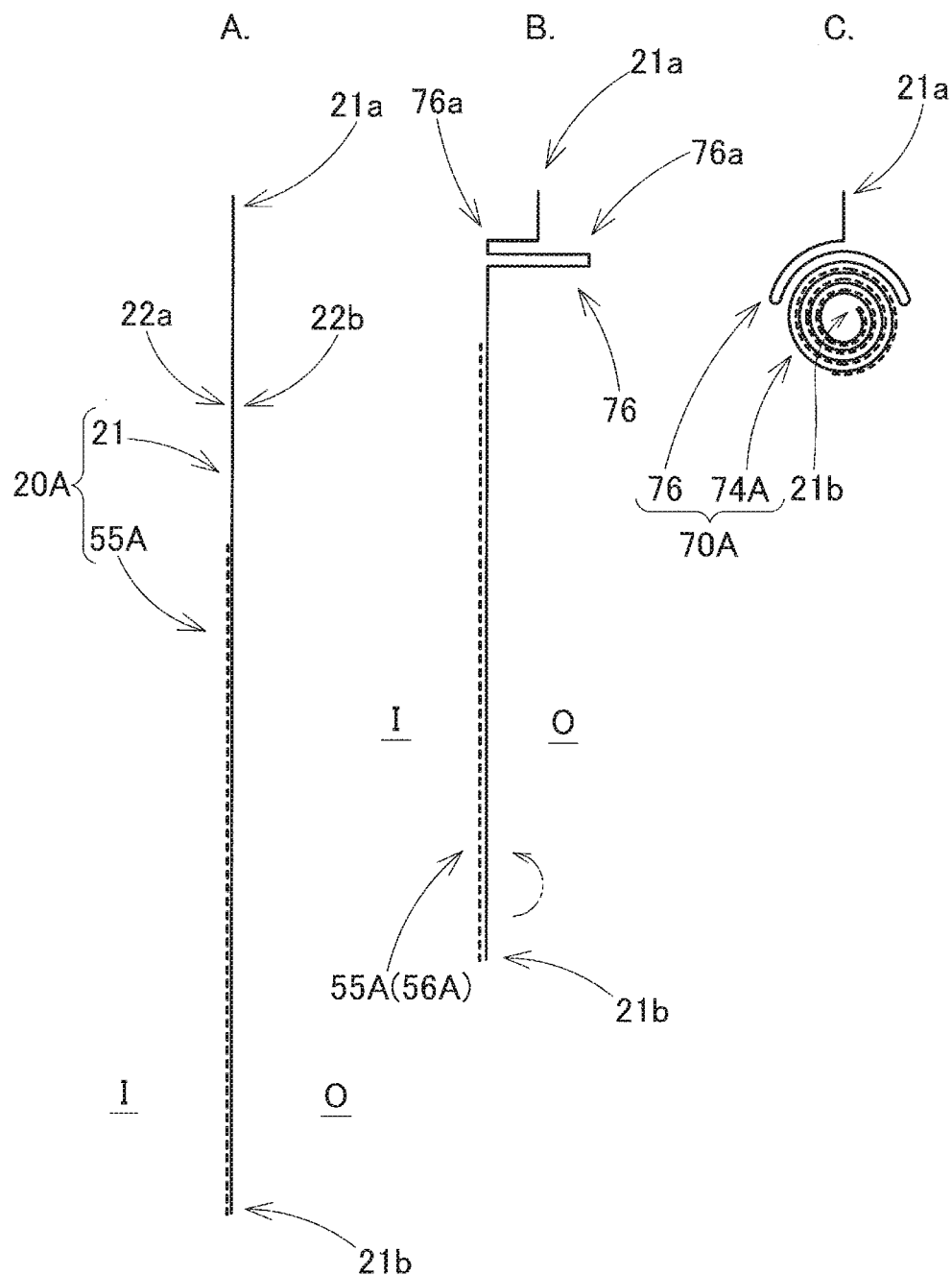
FIG. 16 is a diagram for illustrating a folded shape of the airbag of the modified example.

In the airbag 20A, the bag body 21 and the support portions 61 which are the same as those in the embodiment are used. The airbag 20A differs from the embodiment in that i) a body 56A of the cover sheet 55A is disposed with its lower edge 55b-side extending to the vicinity of the lower edge 21b of the bag body 21, ii) as shown in FIG. 16, a roll-folded portion 74A is formed by rolling the lower edge 21b outward, that is, toward the exterior side wall portion 22b, without forming the folded-in-half body 72, and iii) the lower edge 55b of the cover sheet 55A is partially sewn to the lower edge 21b by sewn portions 60. The configurations of the other portions of the airbag 20A are the same as those of the airbag 20 of the embodiment. As in the embodiment, the airbag 20A is provided in an airbag device M, and the airbag device M is installed in the vehicle V.

Figure 17:
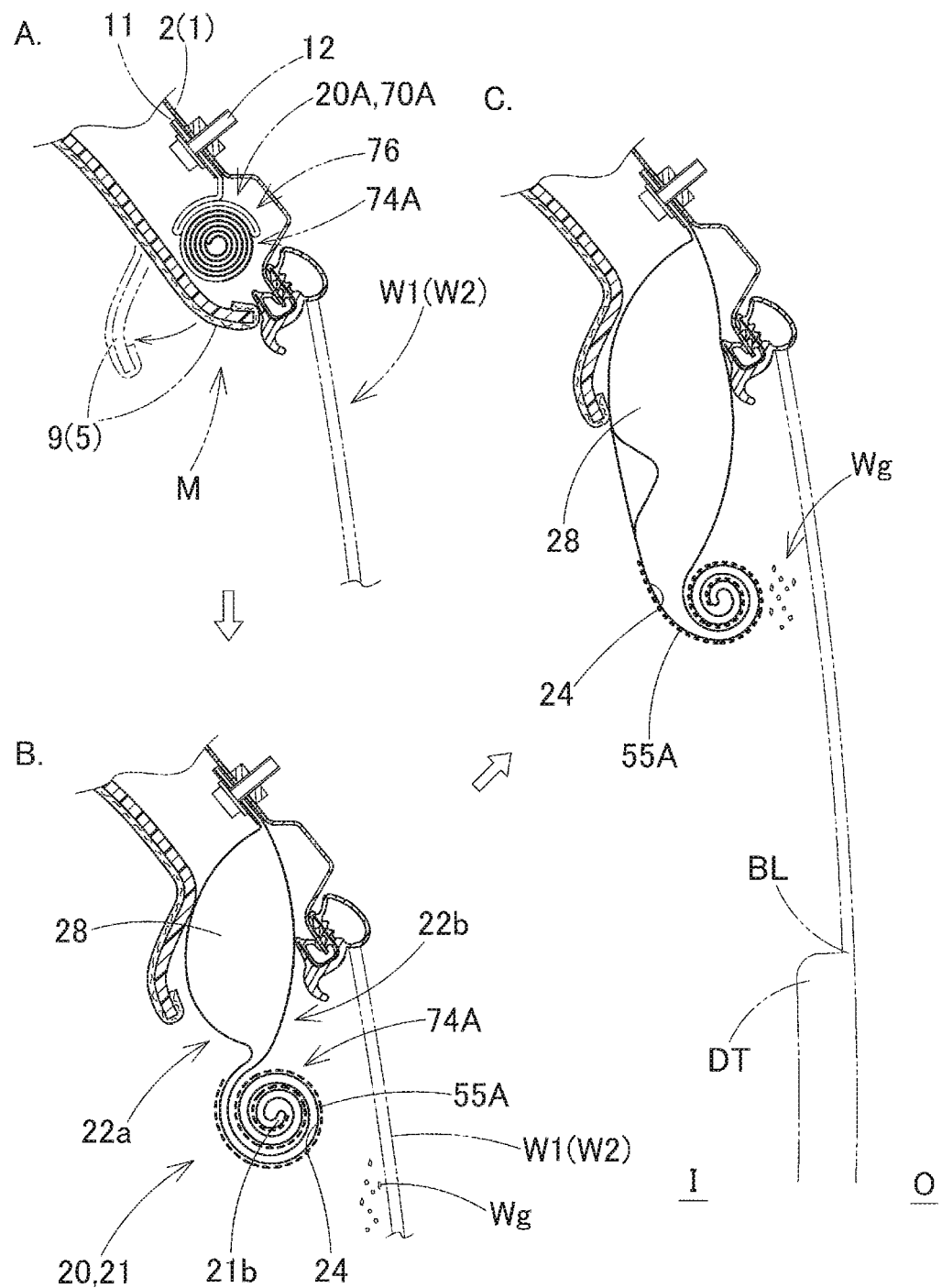
FIG. 17 shows schematic vertical sectional views for sequentially illustrating operating states of the head-protecting airbag device of the embodiment including the airbag of the modified example.
Figure 18:
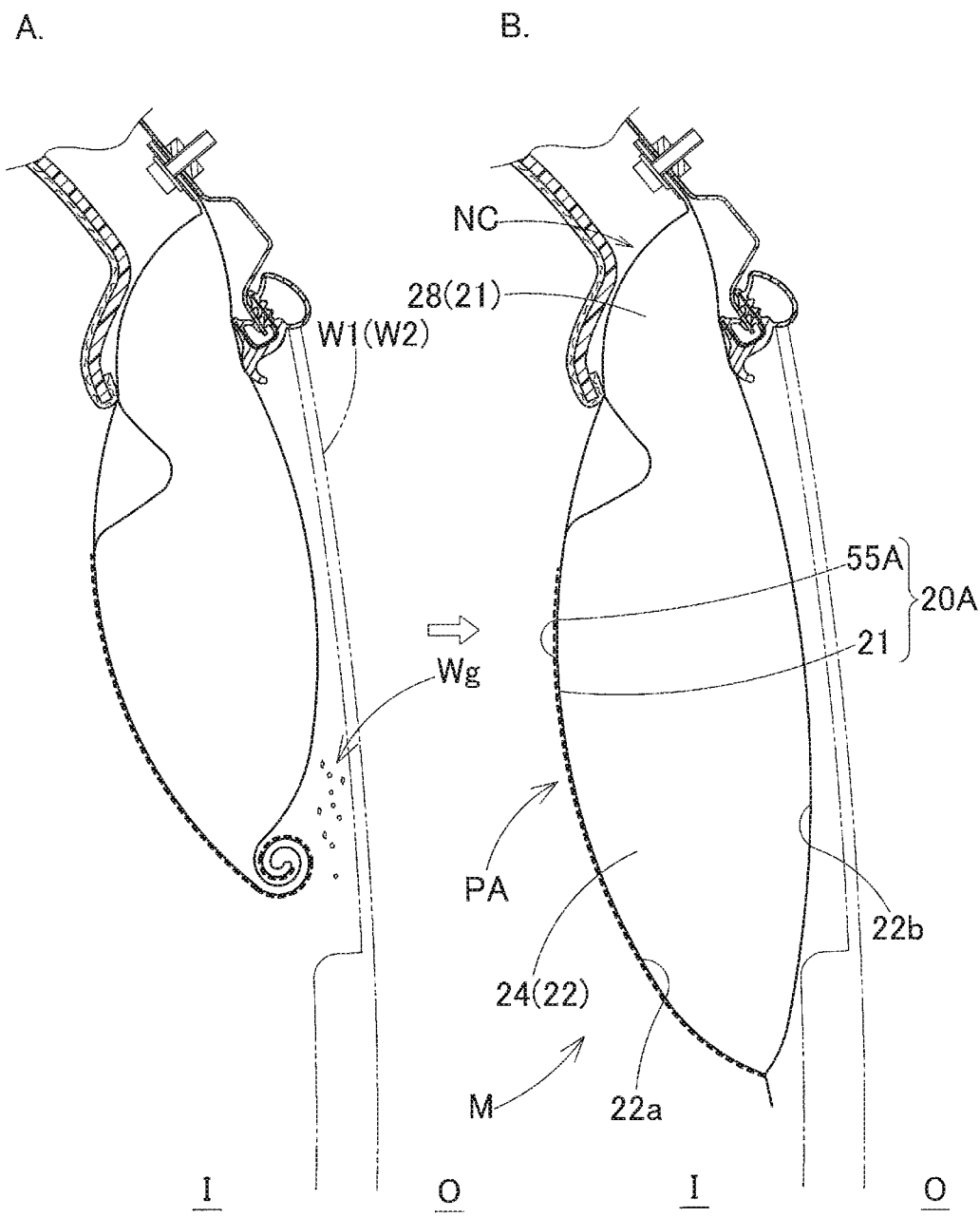
FIG. 18 shows schematic vertical sectional views for sequentially illustrating operating states of the head-protecting airbag device of the embodiment including the airbag of the modified example, FIG. 18 showing the operating states after the operating states shown in FIG. 17 occur.

After the airbag device M including the airbag 20A is installed in the vehicle V, when the airbag device M is operated to release the roll-folding at an initial stage of deployment at the time of deployment and inflation of the airbag 20A, the airbag 20A is deployed to cause the surface of the interior side wall portion 22a in the gas inflow portion 22 of the bag body 21 to sequentially contact the windows W1 and W2 from the upper portion side to the lower portion side while roll-folding is released, as shown in FIG. 17 at A to C and FIG. 18 at A and B. Since the cover sheet 55A is disposed on the surface of the interior side wall portion 22a of the shielding inflatable portion 24 of the gas inflow portion 22, the surface facing the windows W1 and W2, even if broken pieces Wg of the windows W1 and W2 are generated when the roll-folding is released, the shielding inflatable portion 24 of the gas inflow portion 22 can be appropriately protected from those broken pieces Vg. Accordingly, the same operation and effect as those of the embodiment can be obtained.

In the case of the folded shape of a folded body 70A including the roll-folded portion 74A, when the bag body 21 is unfolded, the bag body 21 behaves to unwind the winding while approaching the exterior side O. Therefore, even when a gap between an occupant and the windows W1 and W2 is small, the bag body 21 can smoothly enter the gap, and thus, the deployment and inflation of the airbag 20A can be completed.

In the embodiment, when outward roll folding is carried out by winding the airbag 20 around the folding bar 82 of the folding machine 80, the airbag 20 is set on the setting table 81 such that the fabric portion 65 of the two-layer cover sheet 55 including the fabric portion 65 and the coat portion 66 faces the folding bar 82 that sucks and discharges the air A (see FIGS. 12 and 13). Then, in the folding process, the cover sheet 55 is wrapped on the folding bar 82, then the air A is sucked through the vent holes 83, and then the folding bar 82 is moved while being rotated, thereby carrying out outward roll folding.

In this event, in the embodiment, since the cover sheet 55 includes the coat portion 66 that prevents gas leakage, the cover sheet 55 is wound around the folding bar 82, and since the cover sheet 55 is joined to the bag body 21 by the sewn portions 57 and 58, as the cover sheet 55 is wound around the folding bar 82, the bag body 21 is also wound around the folding bar 82 with the cover sheet 55 interposed between the bag body 21 and the folding bar 82. Thereafter, with the rotation of the folding bar 82, the bag body 21 is smoothly roll-folded together with the cover sheet 55.

Thereafter, when the folding bar 82 is pulled out of the roll-folded portion 74 after completion of the roll folding, the folding bar 82 is pulled out of the roll-folded portion 74 while the air A is discharged through the vent holes 83 as shown in FIG. 13. In this event, the fabric portion 65 of the cover sheet 55 is wound on the folding bar 82, instead of the coat portion 66 of the cover sheet 55. Consequently, the air A permeates the fabric portion 65 to reduce the frictional resistance, and accordingly, it is possible to easily pull out the folding bar 82 and thus to smoothly obtain the folded body 70.

In a configuration opposite to this, i.e., in a configuration in which the coat portion 66 of the cover sheet 55 that is joined to the bag body 21 is disposed on the side opposite to the exterior side wall portion 22b so as to be disposed on the side that contacts the folding bar 82, the folded body 70 cannot be smoothly obtained. In the folding process, the cover sheet 55 is wrapped on the folding bar 82, then the air A is sucked through the vent holes 83, and then the folding bar 82 is moved while being rotated, thereby carrying out outward roll folding. In this case, the coat portion 66 that prevents gas leakage of the cover sheet 55 faces the folding bar 82, and thus, the cover sheet 55 is stuck to the folding bar 82 and is wound around the folding bar 82, and the bag body 21 is also smoothly wound around the folding bar 82 by the sewn portions 57 and 58. However, in the case where the folding bar 82 is pulled out of the roll-folded portion 74 after completion of the roll folding, if the coat portion 66 of the cover sheet 55 is disposed on the folding bar 82 in a state where the coat portion 66 is in contact with an outer peripheral surface 82a of the folding bar 82, even when the air A is discharged through the vent holes 83 to form a gap H between the coat portion 66 and the folding bar 82, it is inevitable that the coat portion 66 made of urethane or the like with high adhesion (stickiness) should partially contact the folding bar 82. Consequently, the folding bar 82 is subjected to the resistance of the coat portion 66 and thus cannot be easily pulled out of the roll-folded portion 74. Accordingly, an operation is required to increase the amount of the air that is discharged through the vent holes 83, and to pull out the folding bar 82 while shifting the folding bar 82 little by little.

In a case where the cover sheet 55 is formed of only the fabric portion 65 without providing the coat portion 66, in the folding process, the cover sheet 55 (the fabric portion 65) is wrapped on the folding bar 82, then the air A is sucked through the vent holes 83, and then the folding bar 82 is moved while being rotated, thereby carrying out outward roll folding. In this case, the air A passes through the fabric portion 65, and thus, the fabric portion 65 cannot be wound around the folding bar 82. As a result, the folding bar 82 rotates while the fabric portion 65 is not wound around the folding bar 82.

Therefore, in the embodiment, the cover sheet 55 that is joined to the bag body 21 is of the two-layer type in which the coat portion 66 is provided on the fabric portion 65, the coat portion 66 is disposed to face the bag body 21, and the disposition portion where the cover sheet 55 is disposed is set as a base point of roll folding of the airbag 20 that is wound around the folding bar 82. According to the embodiment, the roll folding process can be smoothly performed and it is possible to obtain the airbag 20 that can be smoothly protected from broken pieces Wg of the windows W1 and W2.

Further, in the case of the airbag 20 of the embodiment, when the folding bar 82 is set on the cover sheet 55, the folding bar 82 is set on the non-sewn portions 59 between upper and lower parts of each sewn portion 57 divided in the upper-lower direction and between upper and lower parts of the sewn portion 58 divided in the upper-lower direction. Since there are not irregularities due to sewing on the surface of the cover sheet 55 from which the folding bar 82 starts winding, the fabric portion 65 of the cover sheet 55 is stuck to the outer peripheral surface 82*a* of the folding bar 82 without slipping, so that subsequent roll folding can be smoothly carried out.

A cover sheet for protecting the shielding inflatable portion 24 of the bag body 21 of the airbag 20, 20A from broken pieces Wg of the windows W1 and W2 or the like may be formed of a flexible fabric portion 65 provided with no coat portion 66, a non-woven fabric, a resin sheet, or the like.

What is claimed is:

1. A head-protecting airbag device comprising
an airbag fixedly fitted to a body of a vehicle, the airbag being stored in a folded state along a front-rear direction on a side of an upper edge of a window in an interior side of the vehicle, and configured to be deployed and inflated downward so as to cover an interior side of the window when an inflation gas flows into the airbag, wherein:
the airbag includes a bag body and a cover sheet, the bag body including a gas inflow portion configured to allow the inflation gas to flow into the gas inflow portion, the bag body being configured to be deployed and inflated from the folded state so as to cover the interior side of the window when the inflation gas flows into the gas inflow portion, and the cover sheet having flexibility and being attached to the bag body so as to protect the bag body by covering a surface, at a window side, of the gas inflow portion at a time of deployment and inflation;
the gas inflow portion includes a gas supply passage portion and a shielding inflatable portion, the gas supply passage portion being located in an upper edge side of the bag body, and disposed along the upper edge of the window, the gas supply passage portion being configured such that the inflation gas initially flows through the gas supply passage portion, and the shielding inflatable portion being disposed below the gas supply passage portion and configured to be inflated to shield the window; and
the cover sheet is attached to the bag body such that the shielding inflatable portion, rather than the gas supply passage portion, is a protected area, by providing a non-covered area in an upper edge side of the gas inflow portion, the non-covered area being an area in which the cover sheet is not disposed,
wherein the cover sheet is attached to the bag body by support portions and edge sewn portions, the support portions protruding upward at intervals along the upper edge side of the bag body, upper end sides of the support portions being sewn to the upper edge side of the bag body, and the edge sewn portions being respectively sewn to both front and rear edges of the bag body.

2. The head-protecting airbag device according to claim 1, wherein:
the bag body includes a double-woven portion formed by double weaving and a connection port portion in the upper edge side of the bag body, the connection port portion being connected to an inflator configured to supply the inflation gas;
the connection port portion is disposed by sewing at an opening in the double-woven portion, the opening being located in the upper edge side of the bag body; and
the support portions of the cover sheet are jointly sewn to the bag body when the connection port portion is sewn at the opening of the bag body.

3. The head-protecting airbag device according to claim 1, wherein the cover sheet is disposed so as to cover substantially an entire region of the gas inflow portion of the bag body along the front-rear direction.

4. A head-protecting airbag device comprising
an airbag fixedly fitted to a body of a vehicle, the airbag being stored in a folded state along a front-rear direction on a side of an upper edge of a window in an interior side of the vehicle, and configured to be deployed and inflated downward so as to cover an interior side of the window when an inflation gas flows into the airbag, wherein:
the airbag includes a bag body and a cover sheet, the bag body including a gas inflow portion configured to allow the inflation gas to flow into the gas inflow portion, the bag body being configured to be deployed and inflated from the folded state so as to cover the interior side of the window when the inflation gas flows into the gas inflow portion, and the cover sheet having flexibility and being attached to the bag body so as to protect the bag body by covering a surface, at a window side, of the gas inflow portion at a time of deployment and inflation;
the gas inflow portion includes a gas supply passage portion and a shielding inflatable portion, the gas supply passage portion being located in an upper edge side of the bag body, and disposed along the upper edge of the window, the gas supply passage portion being configured such that the inflation gas initially flows through the gas supply passage portion, and the shielding inflatable portion being disposed below the gas supply passage portion and configured to be inflated to shield the window; and
the cover sheet is attached to the bag body such that the shielding inflatable portion, rather than the gas supply passage portion, is a protected area, by providing a non-covered area in an upper edge side of the gas inflow portion, the non-covered area being an area in which the cover sheet is not disposed,
wherein:
the gas inflow portion of the bag body is configured such that the inflation gas flows into an area between an interior side wall portion disposed in an interior side of the bag body at a time of completion of deployment and inflation and an exterior side wall portion disposed in an exterior side of the bag body at the time of completion of deployment and inflation;

a folded shape of the airbag stored on the side of the upper edge of the window is such that a folded-in-half body is roll-folded so as to be wound toward an exterior side of the airbag to cause a lower edge side of the folded-in-half body to approach an upper edge side of the folded-in-half body, the folded-in-half body being formed by forming a crease along the front-rear direction in vicinity of an intermediate position of the airbag in an upper-lower direction and folding in half the airbag to cause a lower edge side of the airbag at the time of completion of deployment and inflation to approach an upper edge side of the airbag at the time of completion of deployment and inflation; and the cover sheet is disposed at a part of the exterior side wall portion, the part being the surface, at the window side, of the gas inflow portion at the time of deployment and inflation.

5. A head-protecting airbag device comprising an airbag fixedly fitted to a body of a vehicle, the airbag being stored in a folded state along a front-rear direction on a side of an upper edge of a window in an interior side of the vehicle, and configured to be deployed and inflated downward so as to cover an interior side of the window when an inflation gas flows into the airbag, wherein:

the airbag includes a bag body and a cover sheet, the bag body including a gas inflow portion configured to allow the inflation gas to flow into the gas inflow portion, the bag body being configured to be deployed and inflated from the folded state so as to cover the interior side of the window when the inflation gas flows into the gas inflow portion, and the cover sheet having flexibility and being attached to the bag body so as to protect the bag body by covering a surface, at a window side, of the gas inflow portion at a time of deployment and inflation;

the gas inflow portion includes a gas supply passage portion and a shielding inflatable portion, the gas supply passage portion being located in an upper edge side of the bag body, and disposed along the upper edge of the window, the gas supply passage portion being configured such that the inflation gas initially flows through the gas supply passage portion, and the shielding inflatable portion being disposed below the gas supply passage portion and configured to be inflated to shield the window; and the cover sheet is attached to the bag body such that the shielding inflatable portion, rather than the gas supply passage portion, is a protected area, by providing a non-covered area in an upper edge side of the gas inflow portion, the non-covered area being an area in which the cover sheet is not disposed, wherein:

the gas inflow portion of the bag body is configured such that the inflation gas flows into an area between an interior side wall portion disposed in an interior side of the bag body at a time of completion of deployment and inflation and an exterior side wall portion disposed in an exterior side of the bag body at the time of completion of deployment and inflation;

a folded shape of the airbag stored on the side of the upper edge of the window is such that the airbag is roll-folded so as to be wound toward the exterior side wall portion to cause a lower edge side of the airbag at the time of completion of deployment and inflation to approach an upper edge side of the airbag at the time of completion of deployment and inflation; and the cover sheet is disposed at a part of the interior side wall portion, the part being the surface, at the window side, of the gas inflow portion at the time of deployment and inflation.

* * * * *